US012770177B2

(12) United States Patent
Haapoja et al.

(10) Patent No.: US 12,770,177 B2
(45) **Date of Patent: *Oct. 20, 2026**

(54) COMPUTER-IMPLEMENTED SYSTEMS AND METHODS AND NON-TRANSITORY COMPUTER READABLE MEDIUM FOR IN-STORE PRODUCT RECOMMENDATIONS

(71) Applicant: SHOPIFY INC., Ottawa (CA)

(72) Inventors: Juho Mikko Haapoja, Toronto (CA); Byron Leonel Delgado, Ottawa (CA); Stephan Leroux, East Gwillimbury (CA); Daniel Beauchamp, Toronto (CA)

(73) Assignee: SHOPIFY INC., Ottawa (CA)

( * ) Notice: Subject to any disclaimer, the term of this patent is extended or adjusted under 35 U.S.C. 154(b) by 111 days.

This patent is subject to a terminal disclaimer.

(21) Appl. No.: 18/542,966

(22) Filed: Dec. 18, 2023

(65) Prior Publication Data

US 2024/0119503 A1 Apr. 11, 2024

Related U.S. Application Data

(63) Continuation of application No. 17/110,665, filed on Dec. 3, 2020, now Pat. No. 11,887,173.

(Continued)

(51) Int. Cl.
*G06Q 30/0601* (2023.01)
*G06N 20/00* (2019.01)

(Continued)

(52) U.S. Cl.
CPC ......... *G06Q 30/0631* (2013.01); *G06N 20/00* (2019.01); *H04L 67/306* (2013.01); *H04L 67/535* (2022.05)

(58) Field of Classification Search
CPC .. G06Q 30/0631; G06N 20/00; H04L 67/306; H04L 67/535
See application file for complete search history.

(56) References Cited

U.S. PATENT DOCUMENTS 11,272,256 B2 * 3/2022 Pate ........................ G06V 10/82
2010/0253787 A1 10/2010 Grant (Continued)

FOREIGN PATENT DOCUMENTS

KR 102057227 B1 12/2019
WO WO-2018/203512 A1 11/2018

OTHER PUBLICATIONS

A. Syberfeldt, O. Danielsson and P. Gustavsson, "Augmented Reality Smart Glasses in the Smart Factory: Product Evaluation Guidelines and Review of Available Products," in IEEE Access, vol. 5, pp. 9118-9130, 2017 (Year: 2017).*

(Continued)

*Primary Examiner* — Jeffrey A. Smith
*Assistant Examiner* — Latasha D Ramphal
(74) *Attorney, Agent, or Firm* — Foley & Lardner LLP

(57) ABSTRACT

When a person visits a physical retail store, the merchant often does not have enough information about the person to make meaningful product recommendations. Also, a physical retail store typically has products physically distributed throughout the store. It may be desirable to have some sort of relationship between where the customer is and the location of the product being recommended. In some embodiments, when a person visits the store, a computer determines an identity of the person and generates a product recommendation based on user-specific information for that person. In some embodiments, generating the product recommendation includes detecting that a field of view of a camera of the device has changed, and in response determining a plurality of products within or proximate to a (Continued)

current field of view of the camera. At least one of the plurality of products is then identified as the recommended product.

20 Claims, 14 Drawing Sheets

Related U.S. Application Data

(60) Provisional application No. 63/011,518, filed on Apr. 17, 2020.

(51) Int. Cl.
*H04L 67/306* (2022.01)
*H04L 67/50* (2022.01)

(56) References Cited

U.S. PATENT DOCUMENTS

| | | | | |
|---|---|---|---|---|
| 2013/0293530 | A1* | 11/2013 | Perez | G06Q 30/0251 345/418 |
| 2015/0278928 | A1 | 10/2015 | Nichols et al. | |
| 2017/0039613 | A1 | 2/2017 | Kaehler et al. | |
| 2017/0293971 | A1 | 10/2017 | Dollens | |
| 2017/0301000 | A1 | 10/2017 | Morgan et al. | |
| 2018/0075523 | A1 | 3/2018 | Odizzio et al. | |
| 2018/0114264 | A1 | 4/2018 | Rafii et al. | |
| 2019/0206130 | A1* | 7/2019 | Ericson | G06Q 30/0643 |
| 2019/0244436 | A1 | 8/2019 | Stansell et al. | |
| 2019/0369742 | A1 | 12/2019 | Ghazanfari | |
| 2020/0273092 | A1 | 8/2020 | Wilson et al. | |
| 2021/0004421 | A1* | 1/2021 | Zadorojniy | G06F 16/9536 |
| 2021/0117071 | A1 | 4/2021 | Gharpuray | |
| 2021/0326959 | A1 | 10/2021 | Haapoja et al. | |
| 2022/0092681 | A1 | 3/2022 | Haapoja et al. | |
| 2022/0114639 | A1 | 4/2022 | Christensen et al. | |
| 2022/0383396 | A1 | 12/2022 | Haapoja et al. | |
| 2022/0383397 | A1 | 12/2022 | Haapoja et al. | |

OTHER PUBLICATIONS

Canadian Office Action with Examination Search Report issued in Canadian Application No. 3,147,930 dated Sep. 16, 2024 (4 Pages).

Examination Report Office Action on International Application No. 21151031.8-1218 dated Oct. 17, 2024 (4 Pages).

Advisory Action on U.S. Appl. No. 17/110,665 dated Sep. 28, 2022 (3 pages).

Advisory Action on U.S. Appl. No. 17/110,665 dated Jun. 20, 2023 (3 pages).

Ben Schafer, J., Konstan, J.A. & Riedl, J. 2001, "E-commerce Recommendation Applications", Data Mining and Knowledge Discovery, vol. 5, No. 1-2, pp. 115-153. (Year: 2001).

European Patent Office Examination Report on EP Application No. 21151031 dated May 6, 2023 (7 pages).

Extended European Search Report on EP Application No. 21151031 dated Jun. 25, 2021 (8 pages).

Final Office Action on U.S. Appl. No. 17/332,786 dated Jan. 17, 2023 (12 pages).

Final Office Action on U.S. Appl. No. 17/332,786 dated Oct. 13, 2022 (11 pages).

Final Office Action on U.S. Appl. No. 17/110,665 dated Apr. 7, 2023 (33 pages).

Final Office Action on U.S. Appl. No. 17/110,665 dated Jul. 7, 2022 (32 pages).

Intellectual Property Office of India Examination Report on Application No. 202124007193 dated Jan. 14, 2022 (8 pages).

Moes, Anne, The online appeal of the physical shop: How a physical store can benefit from a virtual representation, Jun. 2017, Heliyon, vol. 3, issue 6 (Year: 2017).

Non-Final Office Action on U.S. Appl. No. 17/332,786 dated Apr. 24, 2023 (11 pages).

Non-Final Office Action on U.S. Appl. No. 17/332,786 dated Jun. 15, 2022 (13 pages).

Non-Final Office Action on U.S. Appl. No. 17/110,665 dated Dec. 22, 2021 (33 pages).

Non-Final Office Action on U.S. Appl. No. 17/110,665 dated Nov. 8, 2022 (32 pages).

Non-Final Office Action on U.S. Appl. No. 17/332,775 dated Oct. 4, 2023 (13 pages).

Non-Final Office Action on U.S. Appl. No. 17/332,786 dated Aug. 16, 2023 (11 pages).

Moes, Anne & van Vliet, Harry. "The online appeal of the physical shop: How a physical store can benefit from a virtual representation". Heliyon 3 (2017). Published in 2017. 30 pages.

* cited by examiner

412

Product Inventory and Location Data

| Product Name | Product Description | Product SKU | Quantity | Location |
|---|---|---|---|---|
| Men's Blue Jeans | Material: Denim<br>Color: Blue<br>Size: 32in x 34in | JX1524BJ34 | 4 | (235, 456, 10) |
| Men's Blue Jeans | Material: Denim<br>Color: Blue<br>Size: 32in x 34in | JX1524BJ34 | 2 | (541, 956, 15) |
| Men's Black Jeans | Material: Denim<br>Color: Black<br>Size: 32in x 34in | JX1544BLJ4 | 3 | (235, 753, 10) |
| Men's Solid Flannel Shirt | Material: Flannel<br>Color: Blue<br>Size: Large | JX1264SFB4 | 2 | (695, 332, 5) |
| Men's Belt | Material: Leather<br>Color: Black<br>Size: 32in | JX2564LBB3 | 6 | (95, 630, 10) |
| ... | ... | ... | ... | ... |

FIG. 6

414

Recommendation Rules

| Rule # | Product Description | Location |
| --- | --- | --- |
| 1 | IF (jeans previously purchased of size X and color Y) AND IF (jeans of size X and color Z are in stock) | THEN recommend jeans of color Z |
| 2 | IF (user's preferred material = flannel) AND IF (location of user is in shirt section) | THEN recommend men's solid flannel shirt |
| 3 | IF (jeans previously purchased) | THEN recommend belt |
| 4 | IF (jeans previously purchased of color blue and waist size 30-40 inches) AND IF (black belt size 30-40 inches in stock) | THEN recommend black belt |
| 5 | IF (user is expressing an interest in black jeans) AND IF (brown belt is in stock) | THEN recommend brown belt |
| 6 | IF (user previously viewed a flannel shirt online) AND IF (flannel shirts are in stock) | THEN recommend flannel shirts |
| ... | ... | ... |

FIG. 7

COMPUTER-IMPLEMENTED SYSTEMS AND METHODS AND NON-TRANSITORY COMPUTER READABLE MEDIUM FOR IN-STORE PRODUCT RECOMMENDATIONS

CROSS-REFERENCE TO RELATED APPLICATIONS

The present application is a continuation of U.S. patent application Ser. No. 17/110,665, entitled "Computer-Implemented Systems and Methods for In-Store Product Recommendations", which was filed on Dec. 3, 2020, which in turns claims the benefit under 35 U.S.C § 119(e) of U.S. Provisional Patent Application Ser. No. 63/011,518, entitled "Computer-Implemented Systems and Methods for In-Store Product Recommendations", which was filed on Apr. 17, 2020. Both of the foregoing patent applications are incorporated herein by reference.

FIELD

The present application relates to the use of computer technology to assist with product recommendations in a physical retail store.

BACKGROUND

A merchant may operate a physical retail store that customers are able to visit in person in order to view and purchase products. A physical retail store is sometimes alternatively referred to as a "brick and mortar" store.

A person entering a physical retail store may be a return customer or a new visitor. Even if the person is a return customer, the merchant might not recognize the person, e.g. if the person only made a single purchase many months ago. Even if the merchant recognizes the person as a return customer, the merchant typically has little information about the return customer, other than what the merchant can remember or immediately see (e.g. the person is an adult male). The merchant often does not have enough information about the person to make meaningful recommendations for products for sale in the store. More generally, the merchant might not remember or be aware of all the possible product recommendations for the particular inventory present in that store.

Also, a physical retail store typically has products physically distributed throughout the store. It may be desirable to have some sort of association between where the customer is in the store and the location of the product being recommended, e.g. so that the customer is not recommended a product located at the opposite end of the store from where the customer is currently located.

SUMMARY

It is desired to use computer technology to try to mitigate one or more of the problems identified above.

In some embodiments, when a person visits a physical retail store, a computer determines an identity of the person and generates a product recommendation based on user-specific information for that person. In some embodiments, the product recommendation is also or instead based on store inventory information recorded in computer memory. In some embodiments, the product recommendation is also or instead based on the person's position (e.g. physical location and/or orientation) in the store, and/or based on a product in which the person expresses an interest. In some embodiments, product recommendation rules are stored and used to generate the product recommendations.

In some embodiments, when a person enters a physical retail store, a recognition step is first performed in order to associate the person with a user in the computer system. The user is identified by a user identification (ID). In some embodiments, the recognition step may involve performing facial recognition and/or communicating with the person's mobile phone to obtain the user ID. The user ID is used to retrieve, from computer memory, information stored in relation to that user ID. The information may comprise characteristics specific to the user, e.g. user-specific information such as (but not limited to) previous purchase history of the user, and/or size of the user, and/or previous interactions the user had with the merchant (such as text or email exchanges with the merchant), and/or address or billing information for the user, etc. In some embodiments, the user-specific information is then used to make product recommendations that are specific to the user. In some embodiments, product recommendations are also or instead based on other information obtained by the computer, e.g. based on store inventory information, the person's physical location in the store, etc.

As one example: the computer uses an indoor positioning system (IPS) or beacon technology to recognize that the user is in the section of the store that sells jeans; the computer mines the user's profile to determine that last year the user purchased blue jeans having a 32 inch waist; the computer has stored in memory the rule "if jeans previously purchased of size X and color Y, and if location of user is in jeans section, then recommend jeans in stock having size X and having a color different from color Y." The computer executes the rule and determines that black jeans with 32 inch waist are in stock and satisfy the outcome of the rule. The recommendation of black jeans is then surfaced to the merchant, e.g. on the merchant's mobile device or augmented reality (AR) glasses. The 32 inch waist size may also be surfaced to the merchant for their information. In some embodiments, the location of the black jeans may be identified for the merchant, e.g. using AR wayfinding or by causing activation of a visual or audible sensor on or near the recommended black jeans displayed in the store. For example, when it is detected that the location of the merchant's device is near the location of the black jeans, the digital image captured by the camera of the merchant's device is processed, e.g. using image processing, to try to identify the recommended black jeans in the image. Once they are identified, a digital object may be presented on the merchant device in order to accentuate the black jeans. For example, the digital object may be a dot presented on the merchant device over the black jeans.

In some embodiments, the recommendation is instead (or additionally) presented on the customer's device, e.g. in an implementation in which the product recommendations are presented to the customer directly on the customer's device.

In some embodiments, a computer-implemented method includes detecting that a field of view of a camera of a device has changed. Responsive to detecting that the field of view of the camera has changed, a plurality of products within or proximate to a current field of view of the camera is determined. At least one of the plurality of products is identified as a recommended product. The method may further include causing accentuation of the recommended product. The device may be the customer's device and/or the merchant's device. The detecting that the field of view of the camera has changed may be performed in different ways, e.g. detecting a change in position of the device and/or detecting a change in an image captured by the camera and/or detecting a change in at least one parameter of the camera. The accentuation of the recommended product may occur in different ways, e.g. accentuating a mechanism on the recommended product and/or accentuating a display or storage unit on which or in which the recommended product resides and/or presenting a visual indicator on a display of the device, etc.

In some embodiments, a computer-implemented method includes obtaining a user identity associated with a person visiting a retail store. The method further includes retrieving, from memory, a user profile linked to the user identity. The user profile stores information about the person. The method may further include generating a product recommendation based on the information from the user profile. The method may further include conveying the product recommendation for presentation on a user interface of a device. The product recommendation is for a recommended product. In some embodiments, conveying the product recommendation for presentation on the user interface of the device includes conveying an indication of the recommended product for display on the user interface of the device. In some embodiments, generating the product recommendation may include: detecting that a field of view of a camera of the device has changed, and responsive to detecting that the field of view of the camera has changed, determining a plurality of products within or proximate to a current field of view of the camera. In some embodiments, one of the plurality of products may be identified as the recommended product. In some embodiments, the method may include causing accentuation of the recommended product. Causing accentuation of the recommended product may include instructing accentuation of a mechanism on the recommended product and/or instructing accentuation of a display or storage unit on which or in which the recommended product resides and/or instructing presentation of a visual indicator on the display of the device, etc.

A system is also disclosed that is configured to perform the methods disclosed herein. For example, the system may include a memory to store information, e.g. to store a user identity associated with a person visiting a retail store, and/or to store a user profile having information about the person. The system may further include at least one processor to directly perform (or instruct the system to perform) the method steps. In another embodiment, there is provided a computer-readable medium having stored thereon computer-executable instructions that, when executed by a computer, cause the computer to the perform operations of the methods disclosed herein.

According to one embodiment, a computer-implemented method may include obtaining a user identity associated with a person visiting a retail store. The method may further include retrieving, from memory, a user profile linked to the user identity. The user profile may store information about the person. The method may further include generating a product recommendation based on the information from the user profile. The method may further include conveying the product recommendation for presentation on a user interface of a device.

In some implementations, the product recommendation may be for a recommended product, and conveying the product recommendation for presentation on the user interface of the device may include conveying an indication of the recommended product for display on the user interface of the device. In some implementations, generating the product recommendation may include: detecting that a field of view of a camera of the device has changed; responsive to detecting that the field of view of the camera has changed, determining a plurality of products within or proximate to a current field of view of the camera; and identifying one of the plurality of products as the recommended product.

In some implementations, the method may include causing accentuation of the recommended product. Causing accentuation of the recommended product may include at least one of: instructing accentuation of a mechanism on the recommended product; instructing accentuation of a display or storage unit on which or in which the recommended product resides; or instructing presentation of a visual indicator on the display of the device. The visual indicator may accentuate the recommended product in an image displayed on the display of the device.

In some implementations, detecting that the field of view of the camera has changed may include at least one of: detecting a change in position of the device; detecting a change in an image captured by the camera; or detecting a change in at least one parameter of the camera. In some implementations, the position includes location and/or orientation of the device. The orientation may be determined from at least one sensor on the device. In some implementations, determining the plurality of products may include determining which products are within or proximate to the current field of view of the camera based on at least one parameter of the camera and/or based on the location and/or the orientation of the device.

In some implementations, the information in the user profile may include purchase history of the person, and the product recommendation may be generated based on the purchase history.

In some implementations, the information in the user profile may include an indication of one or more products viewed online by the person, and the product recommendation may be generated based on the indication of the one or more products viewed online by the person.

In some implementations, generating the product recommendation may include evaluating the information from the user profile against one or more conditions of a rule, and selecting the product recommendation as the outcome indicated by the rule when every condition of the rule is met.

In some implementations, the product recommendation may be based on one or more rules stored in memory. In some implementations, the one or more rules may be relationships or patterns determined by a machine learning algorithm during training. In some implementations, generating the product recommendation may include providing the information from the user profile as an input to the machine learning algorithm and selecting the product recommendation from a resulting output of the machine learning algorithm.

In some implementations, the device is a merchant device, the product recommendation is for a particular product, and conveying the product recommendation for presentation on the user interface of the device includes transmitting an indication of the particular product to the merchant device. In some implementations, the method may include determining a location of the particular product, and instructing the merchant device to display a visual guide on the user interface of the merchant device. The visual guide may help to guide the merchant to the particular product.

According to another embodiment, a system may include a memory to store a user identity associated with a person visiting a retail store. The memory may also or instead store a user profile having information about the person. The system may further include at least one processor to: obtain the user identity and retrieve the user profile based on the user identity; generate a product recommendation based on the information from the user profile; and convey the product recommendation for presentation on a user interface of a device.

In some implementations, the product recommendation may be for a recommended product. In some implementations, the at least one processor may convey the product recommendation for presentation on the user interface of the device by conveying an indication of the recommended product for display on the user interface of the device. In some implementations, the at least one processor is to generate the product recommendation by performing operations including: detecting that a field of view of a camera of the device has changed; responsive to detecting that the field of view of the camera has changed, determining a plurality of products within or proximate to a current field of view of the camera; and identifying one of the plurality of products as the recommended product.

In some implementations, the at least one processor is to cause accentuation of the recommended product by performing at least one of: instructing accentuation of a mechanism on the recommended product; instructing accentuation of a display or storage unit on which or in which the recommended product resides; or instructing presentation of a visual indicator on the display of the device, the visual indicator accentuating the recommended product in an image displayed on the display of the device.

In some implementations, the at least one processor is to detect that the field of view of the camera has changed by performing at least one of: detecting a change in position of the device; detecting a change in an image captured by the camera; or detecting a change in at least one parameter of the camera. In some implementations, the position may includes location and/or orientation of the device. In some implementations, the orientation may be determined from at least one sensor on the device. In some implementations, the at least one processor may determine the plurality of products by performing operations including determining which products are within or proximate to the current field of view of the camera based on at least one parameter of the camera and/or based on the location and/or the orientation of the device.

In some implementations, the information in the user profile may include purchase history of the person, and the product recommendation is to be generated based on the purchase history.

In some implementations, the information in the user profile may include an indication of one or more products viewed online by the person, and the product recommendation is to be generated based on the indication of the one or more products viewed online by the person.

In some implementations, the at least one processor is to generate the product recommendation by performing operations including: evaluating the information from the user profile against one or more conditions of a rule, and selecting the product recommendation as the outcome indicated by the rule when every condition of the rule is met.

In some implementations, the product recommendation may be based on one or more rules stored in memory. The one or more rules may be relationships or patterns determined by a machine learning algorithm during training. In some implementations, the at least one processor is to generate the product recommendation by performing operations including: providing the information from the user profile as an input to the machine learning algorithm and selecting the product recommendation from a resulting output of the machine learning algorithm.

In some implementations, the device is a merchant device. In some implementations, the product recommendation is for a particular product. In some implementations, the at least one processor is to convey the product recommendation for presentation on the user interface of the device by transmitting an indication of the particular product to the merchant device. In some implementations, the at least one processor is to determine a location of the particular product and instruct the merchant device to display a visual guide on the user interface of the merchant device. The visual guide may be for helping to guide the merchant to the particular product.

According to another embodiment, a computer-readable medium is provided having stored thereon computer-executable instructions that, when executed by a computer, cause the computer to perform operations. The operations may include obtaining a user identity associated with a person visiting a retail store. The operations may further include retrieving, from memory, a user profile linked to the user identity, the user profile storing information about the person. The operations may further include generating a product recommendation based on the information from the user profile. The information may further include conveying the product recommendation for presentation on a user interface of a device.

According to another embodiment, a computer-implemented method includes detecting that a field of view of a camera of a device has changed. The method may further include: responsive to detecting that the field of view of the camera has changed, determining a plurality of products within or proximate to a current field of view of the camera. The method may further include identifying one of the plurality of products as a recommended product. The method may further include causing accentuation of the recommended product.

In some implementations, causing accentuation of the recommended product may include at least one of: instructing accentuation of a mechanism on the recommended product; instructing accentuation of a display or storage unit on which or in which the recommended product resides; or instructing presentation of a visual indicator on a display of the device. The visual indicator may accentuate the recommended product in an image displayed on the display of the device.

In some implementations, detecting that the field of view of the camera has changed may include at least one of: detecting a change in position of the device; detecting a change in an image captured by the camera; or detecting a change in at least one parameter of the camera.

In some implementations, the plurality of products may be determined based on the position of the device. In some implementations, the position may include location and/or orientation of the device. In some implementations, the orientation may be determined from at least one sensor on the device. In some implementations, the determining the plurality of products may include determining which products are within or proximate to the current field of view of the camera based on at least one parameter of the camera and/or based on the location and/or the orientation of the device. In some implementations, the at least one sensor includes an accelerometer, and the orientation of the device may be determined using the accelerometer. In some implementations, the location may be determined using at least one of: an indoor positioning system (IPS); a beacon; a radio-frequency identification (RFID) reader on the device; a machine-readable code reader on the device; or image processing of at least one image captured by the camera.

In some implementations, the method may include obtaining the position of the device by performing processing of at least one image captured by the camera to identify at least one feature in the image that is indicative of the position of the device.

In some implementations, identifying one of the plurality of products as the recommended product may include: obtaining a user identity of a person visiting the retail store; retrieving, from memory, a user profile linked to the user identity, the user profile storing information about the person; and generating the recommended product based on the information from the user profile.

In some implementations, the information in the user profile may include an indication of one or more products viewed online by the person, and the recommended product may be generated based on the indication of the one or more products viewed online by the person.

In some implementations, the information in the user profile may include purchase history of the person, and the recommended product may be generated based on the purchase history.

In some implementations, generating the recommended product may include evaluating the information from the user profile against one or more conditions of a rule, and selecting the recommended product as the outcome indicated by the rule when every condition of the rule is met.

In some implementations, generating the recommended product may include providing the information from the user profile as an input to a machine learning algorithm and selecting the recommended product from a resulting output of the machine learning algorithm.

According to another embodiment, a system is provided having a processor to cause the system to carry out any of the methods described herein.

According to another embodiment, a computer program is provided which, when executed by a computer, causes the computer to carry out the steps of any of the methods described herein.

BRIEF DESCRIPTION OF THE DRAWINGS

Embodiments will be described, by way of example only, with reference to the accompanying figures wherein:

FIG. 6 illustrates an example of product inventory and location data for a retail store, according to one embodiment;

FIG. 7 illustrates an example of recommendation rules, according to one embodiment;

DETAILED DESCRIPTION

For illustrative purposes, specific example embodiments will now be explained in greater detail below in conjunction with the figures.

Example e-Commerce Platform

In some embodiments, the methods disclosed herein may be performed in relation to a commerce platform, which will be referred to herein as an e-commerce platform. Therefore, for completeness, an example of an e-commerce platform will first be described.

Figure 1:
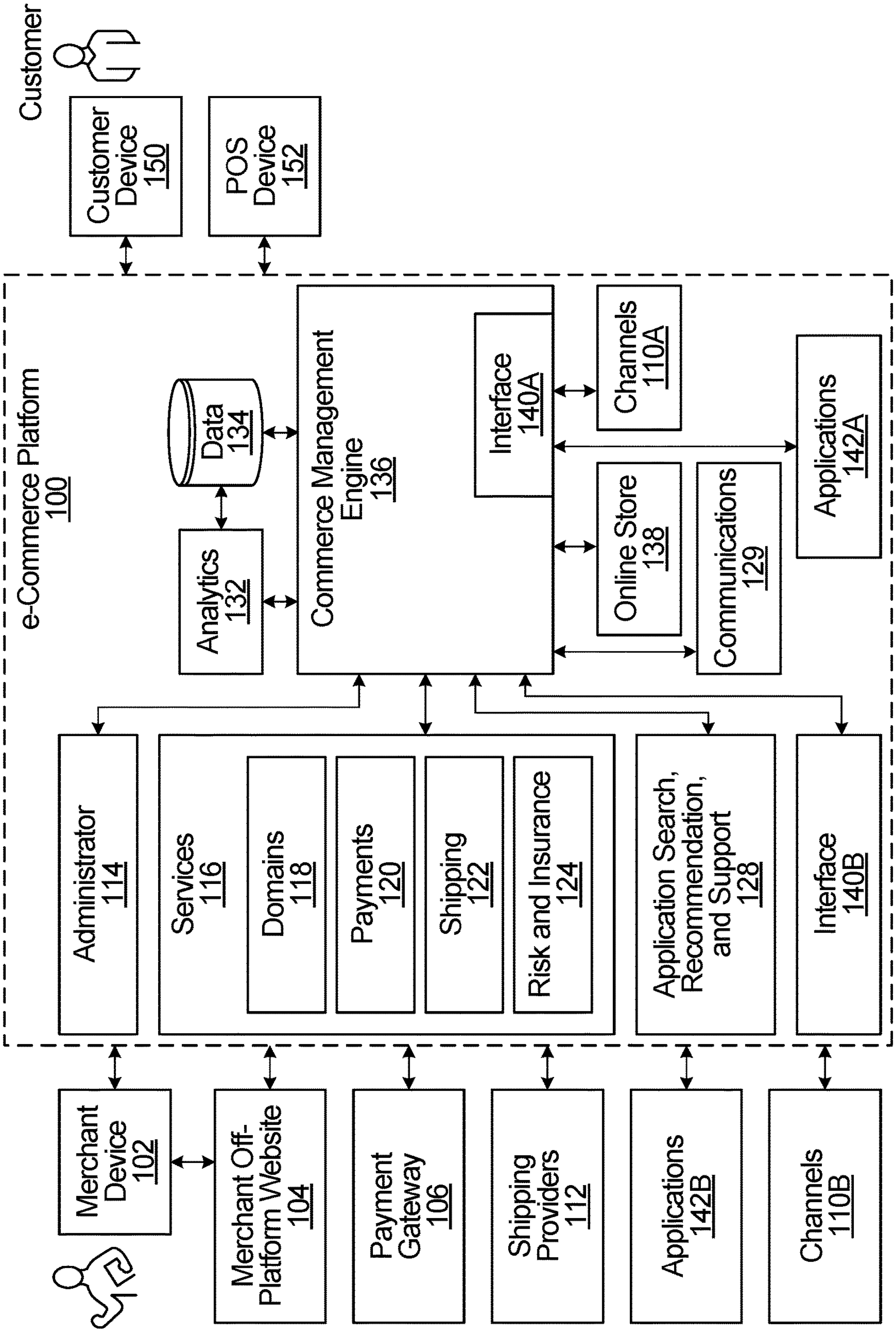
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
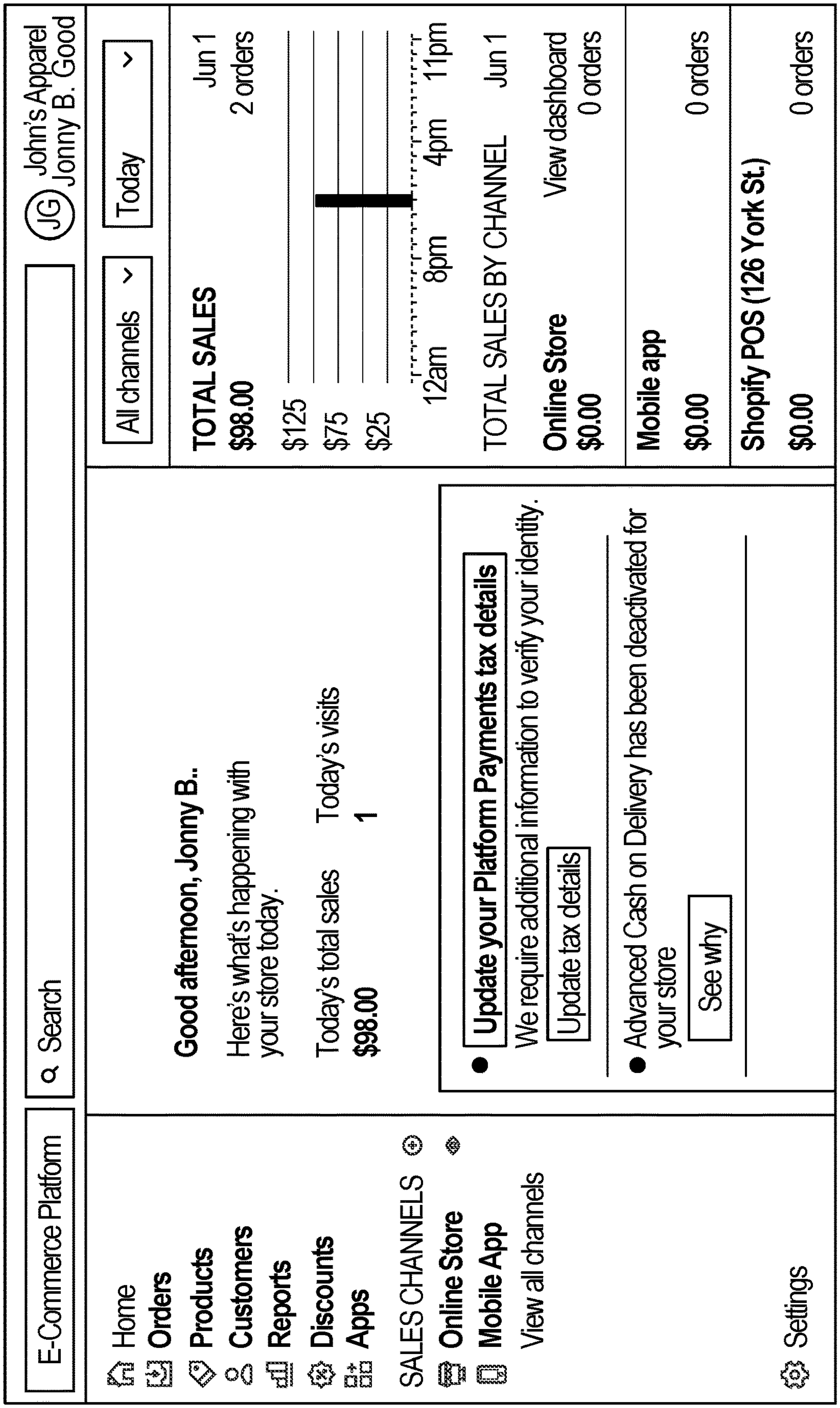
FIG. 2 is an example of a home page of an administrator, according to one embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine

136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual, augmented, or mixed reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Use of the e-Commerce Platform 100 for Product Recommendations in a Physical Retail Store A merchant having a merchant account on the e-commerce platform 100 may have a physical retail store. The merchant might or might not also have an online store. A visitor in the merchant's physical retail store may have a customer account on the e-commerce platform 100 and have an associated user profile stored in the e-commerce platform 100. The user profile may be stored as part of the data 134 in memory. The user profile may store user-specific information, such as previous purchase history of the user, and/or preferences of the user, and/or clothing size of the user, and/or previous interactions the user had with merchants on the e-commerce platform (such as text or email exchanges), and/or address information for the user, and/or billing information for the user, etc. Some of the information stored in the user profile may be associated with the merchant running the physical retail store (e.g. previous purchase history of products sold by that merchant to the user). Other information in the user profile might not be specifically related to the merchant running the physical retail store (e.g. previous purchase history of products bought by the user that were sold by other merchants on the e-commerce platform 100). The person associated with the user profile might have never visited the merchant's physical retail store in the past and/or might have never viewed or purchased any product sold by that merchant, and yet the person might still have a user profile stored in the e-commerce platform 100, e.g. a user profile that indicates preferences of the user, previous purchase history with other merchants on the e-commerce platform 100, etc. If the user does not have a user profile, then a user profile for the person may be created when the person first enters the merchant's physical retail store, e.g. by assigning a unique and new user ID to the user and populating information in the user profile once learned (e.g. if the person makes a purchase).

The e-commerce platform 100 may include a product recommendation engine that generates product recommendations for products for sale in the merchant's physical retail store. A recommendation generated by the product recommendation engine may be based on user-specific information (e.g. information stored in the user's profile in the e-commerce platform 100), and/or based on other information, e.g. based on store inventory information (e.g. stored in memory in the e-commerce platform 100), and/or based on the physical position (e.g. location and/or orientation) of the person in the merchant's retail store, etc. In some embodiments, product recommendation rules are stored in memory in the e-commerce platform 100 and used to generate the product recommendations.

Figure 3:
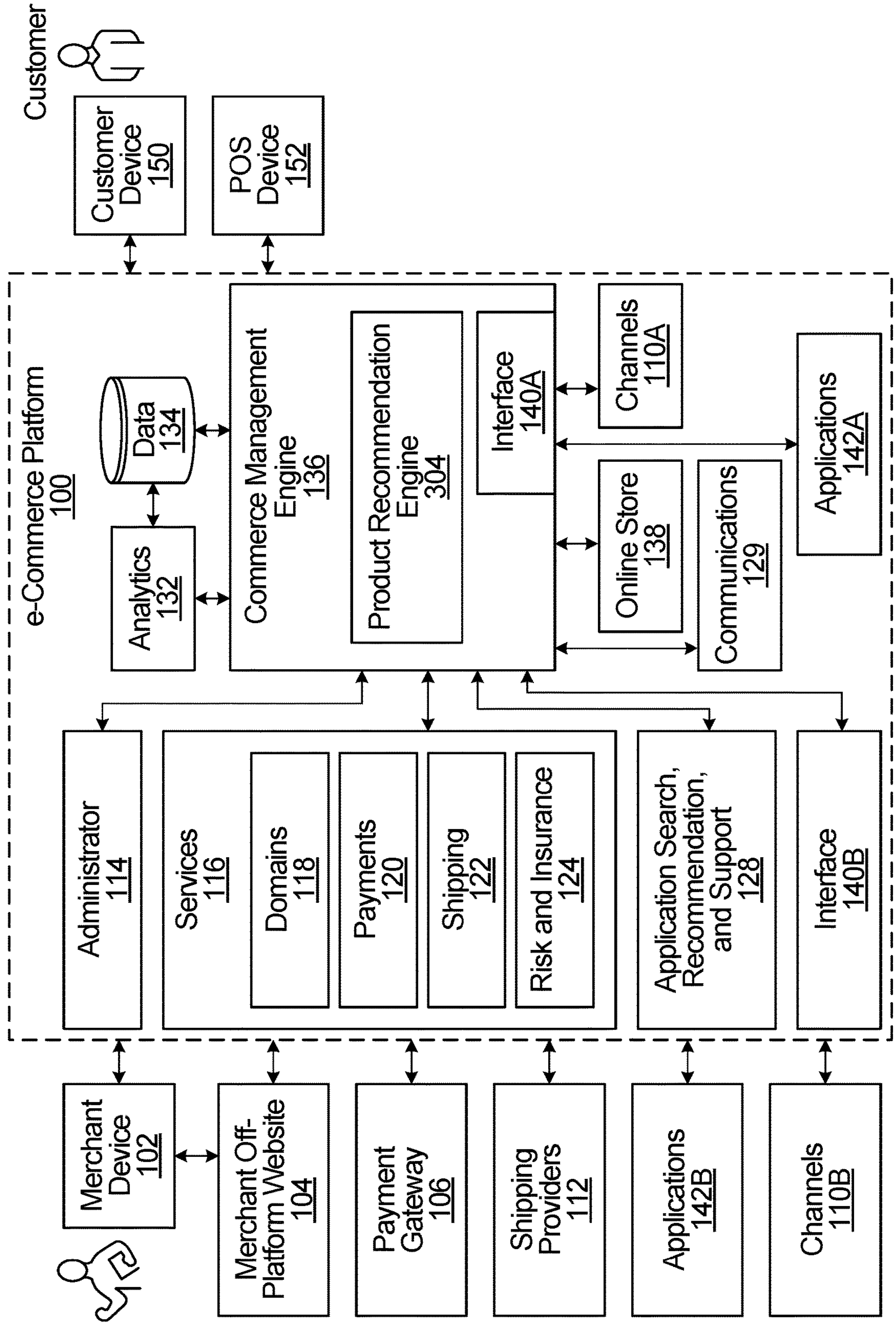
FIG. 3 illustrates the e-commerce platform of FIG. 1, but with a product recommendation engine.

FIG. 3 illustrates the e-commerce platform 100 of FIG. 1, but with a product recommendation engine 304 in the commerce management engine 136. The product recommendation engine 304 may be implemented using processing circuitry, such as a general purpose processor that executes instructions stored in memory or stored in another computer-readable medium. The instruction, when executed, cause the product recommendation engine 304 to perform the operations of the product recommendation engine 304. Alternatively, some or all of the product recommendation engine 304 may be implemented using dedicated circuitry, such as an application specific integrated circuit (ASIC), a graphics processing unit (GPU), or a programmed field programmable gate array (FPGA). In some embodiments, the product recommendation engine 304 may be located externally to the e-commerce platform 100. The product recommendation engine 304 is used to generate product recommendations for a physical retail store, e.g. as described herein.

Although the embodiments described below may be implemented using the product recommendation engine 304 implemented in e-commerce platform 100, the embodiments described below are not limited to the specific e-commerce platform 100 of FIGS. 1 to 3 and could be used in connection with any e-commerce platform. In some embodiments, implementation on or in association with an e-commerce platform is not even required. For example, the functionality described herein may be implemented as a stand-alone component or service (e.g. external to the e-commerce platform 100) or implemented fully or in part by a local computing device (e.g. merchant device) in the physical retail store. Therefore, the embodiments below will be described more generally.

Example System for Product Recommendations in a Physical Retail Store

Figure 4:
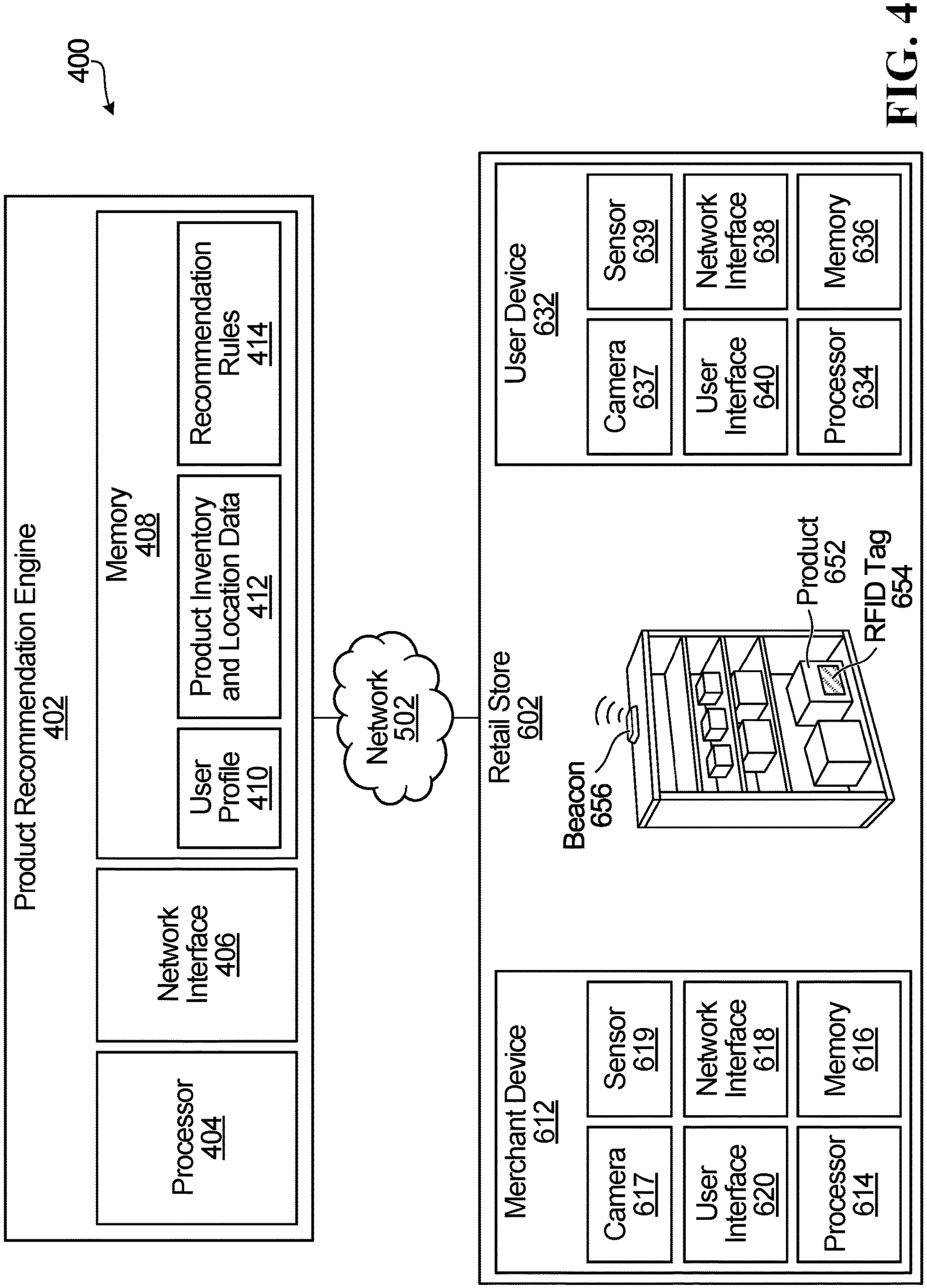
FIG. 4 illustrates a system for product recommendations in a physical retail store, according to one embodiment.

FIG. 4 illustrates a system 400 for product recommendations in a physical retail store, according to one embodiment. The system 400 includes a product recommendation engine 402 and at least one physical retail store 602. Only a single physical retail store 602 is illustrated.

The product recommendation engine 402 includes a processor 404 for implementing the operations described herein that are performed by the product recommendation engine 402, e.g. operations such as identifying a user, generating a product recommendation based on particular information (e.g. user-specific information), detecting that a field of view of a camera has changed, determining a plurality of products within or proximate to a current field of view of the camera, etc. The processor 404 may be implemented by one or more general purpose processors that execute instructions stored in a memory (e.g. in memory 408) or stored in another computer-readable medium. The instructions, when executed, cause the processor 404 to directly perform, or instruct the product recommendation engine 402 to perform, the operations of the product recommendation engine 402. In other embodiments, the processor 404 may be implemented using dedicated circuitry, such as an FPGA, a GPU, or an ASIC.

The product recommendation engine 402 further includes a network interface 406. The network interface 406 is for communicating over a network 502, e.g. to communicate with merchant device 612 and/or user device 632 described below. The network interface 406 may be implemented as a network interface card (NIC), and/or a computer port (e.g. a physical outlet to which a plug or cable connects), and/or a network socket, etc., depending upon the implementation.

The product recommendation engine 402 further includes a memory 408. A single memory 408 is illustrated in FIG. 4, but in implementation the memory 408 may be distributed. The memory 408 stores a user profile 410 for each user identified in the product recommendation engine 402. Only a single user profile 410 is illustrated in FIG. 4. The user profile 410 may be established when the user first visits the retail store 602, or possibly prior to the user first visiting the retail store 602, e.g. if the user uses a software application (such as a "shopping app") to separately register with the product recommendation engine 402 and create a profile, and/or when the user purchases a product in another store of another merchant.

Figure 5:
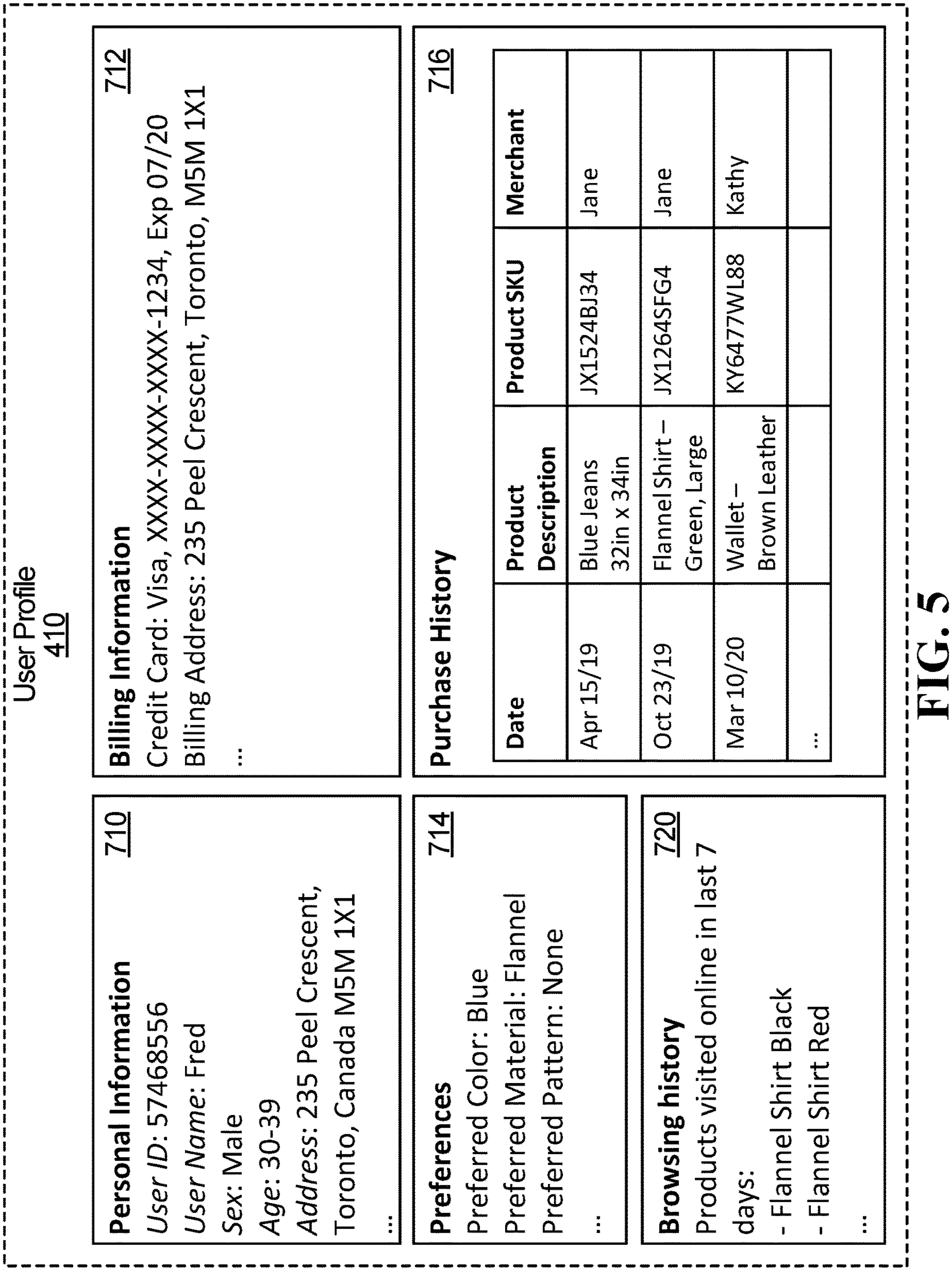
FIG. 5 illustrates an example user profile.

FIG. 5 illustrates an example user profile 410 for user "Fred", according to one embodiment. The user is assigned unique user ID 57468556, which distinguishes the user from other users identified in the product recommendation engine 402. The user profile 410 may include information such as: personal information 710 (e.g. the user's name, age, user ID, etc.); and/or billing information 712 (e.g. the user's credit card information); and/or preferences 714 (e.g. the user's preferred colors, materials, products, etc.); and/or purchase history 716; and/or browsing history 720 (e.g. of products previously viewed on the merchant's website and/or on the website of other merchants on an e-commerce platform). The information illustrated in FIG. 5 is only an example. Additional or different information may be included, e.g. information related to previous exchanges the user had with one or more merchants.

The purchase history 716 may be specific to retail store 602 and/or to the merchant associated with retail store 602. In some embodiments, the purchase history 716 of the user may be recorded for any purchase made from any merchant having a merchant account on or accessible to the product recommendation engine 402. In the example in FIG. 5, "Jane" is the merchant that runs retail store 602. The user Fred has previously purchased blue jeans and a flannel shirt from merchant Jane. It is not indicated in the table in FIG. 5 whether these previous products were purchased from merchant Jane in retail store 602 or through another method (e.g. via Jane's online store). This indication may be included as part of the purchase history 716. In the example in FIG. 5, it is indicated in the purchase history 716 that user Fred previously purchased a wallet from another merchant (merchant "Kathy"). In this example, merchant Kathy has no relation to merchant Jane, except that both merchants are registered with the product recommendation engine 402, e.g. both merchants have a merchant account on or accessible to the product recommendation engine 402. Merchant Jane might or might not have access to the purchase history related to merchant Kathy, depending upon the permission settings. Similarly, browsing history 720 might be specific only to merchant Jane, e.g. only include product views made by user Fred on merchant Jane's website. Alternatively, browsing history 720 might also include the user's browsing history for the online store of other merchants.

The information stored in user profile 410 may be updated whenever user Fred performs an action that provides additional information about user Fred, e.g. when Fred makes additional purchases or performs additional online browsing. The user profile 410 may also be manually updated by user Fred, e.g. user Fred may manually update his preferences using a software app installed on user Fred's mobile phone.

Returning to FIG. 4, the memory 408 of the product recommendation engine 402 also stores product inventory and product location data 412 for each product in stock in the retail store 602. A record of each product in stock in retail store 602 is stored, as well as a location of that product in the retail store 602. FIG. 6 illustrates an example of product inventory and location data 412 for retail store 602, according to one embodiment. Example fields that may be stored for each product in stock include: product name, product description, product ID (e.g. product stock keeping unit (SKU)), quantity of product in stock, etc. Also stored is the location of the product in the store. The location may be stored as an (x, y, z) coordinate in a 3D space of the retail store 602, as is the case in the example illustrated in FIG. 6. Other ways of representing the location of each product may be used instead, e.g. by specifying a region in the store, a shelf number, a bin number, etc. If the same product is located in multiple locations in the store (e.g. some on the floor and some in the stock room), then there may be two separate entries in memory, e.g. as shown in the first two rows of the table in FIG. 6. The data in FIG. 6 may be updated as a product is sold, as a new product arrives, and if the location of a product changes. The details of the storage are implementation specific, and the table format in FIG. 6 is just one example.

Returning to FIG. 4, the memory 408 of the product recommendation engine 402 also stores recommendation rules 414 used for making product recommendations. A recommendation rule may be a unit of decision-making logic that recommends a particular product or product type or category when certain conditions are met. A recommendation rule may be in the form of an "if-then" statement. A recommendation rule may be generated in different ways, depending upon the implementation. For example, a recommendation rule may be custom-created by a merchant, e.g. using the user interface of merchant device 612. As another example, a recommendation rule may be added by the product recommendation engine 402 based on recommendation rules used by other merchants that resulted in a positive outcome for those other merchants (such as a high sales conversion). As another example, a recommendation rule may be manually provided to the product recommendation engine 402 by a 3 rd party, e.g. by a fashion expert. In some embodiments, if the recommendation rule is not created by the merchant, the recommendation rule may first be recommended/presented to the merchant, and authorization might need to be given by the merchant before the recommendation rule is added to recommendation rules 414. A recommendation rule might or might not be specific to a merchant. A recommendation rule might or might not be specific to product inventory a merchant has in stock.

FIG. 7 illustrates an example of recommendation rules 414, according to one embodiment. Some of the rules have one or more conditions that rely on a user's specific information in their user profile 410, e.g. as is the case for example rules 1 to 4 and 6 illustrated in FIG. 7. Some of the rules may have a condition that is independent of the information in the user's profile, but that is based on the activity of the user in the store, e.g. as is the case for example rule 5 in FIG. 7. Some of the rules may be merchant-specific and/or store specific, e.g. a condition of the rule may be that the product to be recommended is in stock (e.g. as in rules 1 and 4 to 6). Some of the rules may have a condition that depends upon the user's physical location in the retail store 602, e.g. as in example rule 2 in FIG. 7.

Note that in some embodiments the recommendation rules 414 are not necessarily discrete rules stored separate from each other, as shown in FIG. 7. For example, the recommendation rules 414 may be relationships or patterns determined by a machine learning algorithm during training, with the trained machine learning algorithm generating a product recommendation based on an input to the trained machine learning algorithm. For example, the machine learning algorithm may be trained on a large number of pictures publicly available on the Internet and determine relationships between products. These relationships may essentially be the recommendation rules 414. Then, for example, when the user profile 410 indicates that Fred previously purchased men's blue jeans, and that information is input into the trained machine learning algorithm, the output may be a recommendation for a mustard yellow T-shirt, e.g. based on a relationship between blue jeans and mustard yellow shirts uncovered during training. The machine learning algorithm may incorporate the restrictions imposed by the product inventory of the retail store 602, e.g. if mustard yellow shirts are not in stock then the machine learning algorithm will return a recommendation that does not include a shirt that is mustard yellow. An indication of the product inventory in stock (e.g. the product inventory data from FIG. 6) may be incorporated during training or post-training of the machine learning algorithm.

Returning to FIG. 4, the retail store 602 includes products for sale, e.g. product 652. In some embodiments, each product may include a feature that allows the product to be uniquely identified from other products or other product types. For example, the feature may be a radio-frequency identification (RFID) tag 654 or some other machine-readable indicium such as, for example, some form of visual machine-readable indicia such as a barcode or QR code. As explained later, this feature (if present) may optionally be used to help determine the location of the product in the retail store 602. In some embodiments, one or more wireless transmitters, e.g. beacon 656, may be present in the retail store 602 to communicate with the user device 632 (e.g.

mobile phone) of a visitor in the store. The wireless communication may be over Bluetooth™ e.g. Bluetooth low energy (LE) if beacon technology is used. In some embodiments, the wireless communication may be over ultrawide band (UWB).

The retail store 602 includes a merchant device 612, which is a computing device used by a merchant of the retail store 602. The merchant device 612 may be a smartphone, laptop, tablet, AR device, etc., depending upon the implementation. An AR device refers to a device that uses augmented reality (AR), mixed reality (MR) and/or virtual reality (VR), e.g. a device such as a smartphone (e.g., a smartphone configured to overlay the camera input), headset or glasses. The merchant device 612 includes a processor 614, a memory 616, a user interface 320, and a network interface 618. The processor 614 directly performs, or instructs the merchant device 612 to perform, the operations of the merchant device 612 described herein, e.g. communicating with the product recommendation engine 402 to receive and present product recommendations, possibly collecting and providing information to the product recommendation engine 402 on product location, possibly communicating information to the product recommendation engine 402 relating to voice and/or images captured by the merchant device 612, etc., depending upon the implementation. The processor 614 may be implemented by one or more general purpose processors that execute instructions stored in a memory (e.g. memory 616) or stored in another computer-readable medium. The instructions, when executed, cause the processor 614 to directly perform, or instruct the merchant device 612 to perform, the operations described herein. In other embodiments, the processor 614 may be implemented using dedicated circuitry, such as a programmed FPGA, a GPU, or an ASIC. The user interface 620 may be implemented as a display screen (which may be a touch screen and possibly integrated into an AR device), and/or a keyboard, and/or a mouse, and/or a ring and/or a speaker etc., depending upon the implementation. The network interface 618 is for communicating over a network, e.g. to communicate with the product recommendation engine 402 and/or a beacon, possibly over network 502. The structure of the network interface 618 will depend on how the merchant device 612 interfaces with the network. For example, if the merchant device 612 is a mobile phone, tablet, or AR device, the network interface 618 may comprise a transmitter/receiver with an antenna to send and receive wireless transmissions to/from the network. If the merchant device 612 is a personal computer connected to the network with a network cable, the network interface 618 may comprise a network interface card (NIC), and/or a computer port (e.g. a physical outlet to which a plug or cable connects), and/or a network socket, etc. The merchant device 612 may further include a camera 617 for capturing images. The camera 617 has associated parameters. Some of the parameters may be physical, e.g. the physical location of the camera 617 on the merchant device 612. Other parameters may be software based, or a combination of physical and software based, e.g. the focal length, the angle of view, and/or the magnification. The merchant device 612 may further include a sensor 619 used for determining orientation of the merchant device 612. An example of such a sensor 619 is an accelerometer, although the sensor 619 may be implemented in a different way (e.g. the sensor 619 may be or include a motion sensor or a magnetometer).

A visitor is assumed to be in retail store 602, and that visitor has an associated computing device, which is labelled as user device 632 in FIG. 4. The user device 632 would typically be a mobile phone carried by the visitor, but may instead be a tablet, laptop, AR device, etc., depending upon the scenario. The user device 632 includes a processor 634, a memory 636, a user interface 340, and a network interface 638. The processor 634 directly performs, or instructs the user device 632 to perform, the operations of the user device 612 described herein, e.g. communicating with the product recommendation engine 402 and/or merchant device 612 to provide the user ID of the user, possibly communicating with beacons in the retail store 602 (e.g. beacon 656), possibly presenting a product recommendation, etc., depending upon the implementation. The processor 634 may be implemented by one or more general purpose processors that execute instructions stored in a memory (e.g. memory 636) or stored in another computer-readable medium. The instructions, when executed, cause the processor 634 to directly perform, or instruct the user device 632 to perform, the operations of the user device 632. In other embodiments, the processor 634 may be implemented using dedicated circuitry, such as a programmed FPGA, a GPU, or an ASIC. The user interface 640 may be implemented as a display screen (which may be a touch screen), and/or a keyboard, and/or a mouse, and/or a speaker etc., depending upon the implementation. The network interface 638 is for communicating over a network, e.g. communicating with the product recommendation engine 402 and/or the merchant device 612 and/or beacon 656, possibly over the network 502. The structure of the network interface 638 will depend on how the user device 632 interfaces with the network. For example, if the user device 632 is a mobile phone or tablet, the network interface 638 may comprise a transmitter/receiver with an antenna to send and receive wireless transmissions to/from the network. If the user device 632 is a laptop connected to the network with a network cable, the network interface 638 may comprise a network interface card (NIC), and/or a computer port (e.g. a physical outlet to which a plug or cable connects), and/or a network socket, etc. The user device 632 may further include a camera 637 for capturing images. The camera 637 has associated parameters. Some of the parameters may be physical, e.g. the physical location of the camera 637 on the user device 632. Other parameters may be software based, or a combination of physical and software based, e.g. the focal length, the angle of view, and/or the magnification. The user device 632 may further include a sensor 639 used for determining orientation of the user device 632. An example of such a sensor 639 is an accelerometer, although the sensor 639 may be implemented in a different way (e.g. the sensor 639 may be or include a motion sensor or a magnetometer).

In some embodiments, the product recommendation engine 402 is part of an e-commerce platform, e.g. e-commerce platform 100. For example, the product recommendation engine 402 may be product recommendation engine 304 illustrated in FIG. 3. However, this is not necessary. The product recommendation engine 402 may instead be provided by another component of an e-commerce platform or implemented as a stand-alone component or service that is external to an e-commerce platform. In some embodiments, either or both of the applications 142A-B of FIG. 3 provide the product recommendation engine 402 in the form of a downloadable application that is available for installation in relation to a merchant account. In some embodiments, at least a portion of the product recommendation engine 402 could be implemented on a merchant device, e.g. on merchant device 102 of FIG. 3 or merchant device 612 of FIG. 4. For example, the merchant device could store and run some or all of the product recommendation engine 402 locally as a software application. FIG. 4 illustrates the product recommendation engine 402 as separate from both the merchant device 612 and the physical retail store 602. The embodiments described below will assume that the product recommendation engine 402 is separate from the merchant device 612 and the physical retail store 602, as illustrated. However, some or all of the product recommendation engine 402 may instead be included on a computing device in the retail store 602, and that computing device might or might not be the same computing device as the merchant device 612. In some embodiments, some of the product recommendation engine 402 may be implemented on the user device 632. For example, in implementations in which product recommendations are directly presented to the customer, some of the operations described as being performed by the product recommendation engine 402 may instead be performed by the user device 632. For example, the user device 632 may determine that the field of view of the camera has changed, and/or may determine a plurality of products within or proximate to a current field of view of the camera, etc. It could be possible in some implementations that the recommendation engine 402 is implemented fully on the user device 632.

Example Methods

Operation of the system for performing a product recommendation will now be described. Not all of the steps described below are necessary in all embodiments. Also, some of the steps may be substituted by other steps instead, and many different variations are described. In the explanation below, the merchant is assumed to be merchant Jane introduced earlier. Merchant Jane is running physical retail store 602 and uses merchant device 612. The person visiting the store is assumed to be user Fred introduced earlier, having user device 632 and having user profile 410 shown in FIG. 5.

In some embodiments, initial setup may be performed by merchant Jane, e.g. as follows. Merchant Jane ensures all product in stock in retail store 602 is added to product inventory and location data 412 in memory 408. In some embodiments, each product is added to the stored product inventory in FIG. 6 when that product is received at the store, e.g. by scanning a shipping label or other machine-readable code on each product or group of products, or by manual entry, e.g. through the user interface 620 of merchant device 612. As another example, in some embodiments each product is added to the product inventory at the same time as capturing that product's location data. That is, a single step of both providing the product ID and its location in the retail store 602 may be performed, e.g. as the merchant walks around the store and records the product location in the manner explained below.

Merchant Jane also populates the location data for each product. An example of location data is that shown in the right-most column of FIG. 6. The following are some example ways in which the location data may be obtained for each product in retail store 602. In one example, the space of the retail store 602 is mapped to a virtual coordinate space, which will be referred to as a coordinate space. Then, each product is assigned an (x, y, z) coordinate in that space. For example, the merchant holds or wears the merchant device 612 and, beginning from an initial location (e.g. the front of the store), the merchant starts walking around the store. The initial location is assigned the origin (0, 0, 0) of the coordinate space. The merchant device 612 may be or include a machine-readable-code scanner (e.g. barcode/QR code scanner) or an RFID scanner. In some implementations, the origin may be associated with a fixed machine readable code such as, for example, a barcode or QR code, e.g. the merchant may start recording their location by scanning a particular machine readable indicium (e.g. a QR code) at the front of the store, which designates the origin of the virtual space, from which the merchant then begins to traverse the store. As the merchant device 612 moves throughout the store, the location of the merchant device 612 is recorded as a coordinate point in the coordinate space. One example way to measure the displacement of the merchant device 612 relative to the initial location is for the merchant device 612 to measure the displacement using an indoor positioning system (IPS), e.g. through the use of triangulation, WiFi Positioning System (WPS) or by GPS, and then map that displacement to an (x, y, z) coordinate. Another example way to measure the displacement of the merchant device 612 relative to the initial location is to use beacon technology. For example, beacons (e.g. beacon 656) may be placed all around the store in order to partition the store into a plurality of 3D regions, where each 3D region spans the transmission range of a respective beacon. Then, when the merchant device 612 enters the region of a particular beacon, the merchant device 612 receives the signal transmission from that beacon, e.g. via Bluetooth™. The signal transmitted from that beacon includes the identifier of that beacon. The identifier is then transmitted from the merchant device 612 to the product recommendation engine 402, which has a predefined mapping of beacon identifiers to physical locations in the store. The beacon may thereby be assigned a location coordinate in the (x, y, z) coordinate space using the predefined known physical location of that beacon. Alternatively, the mapping of the beacon identifiers to physical locations and/or the assigning of the beacon to a location coordinate in the (x, y, z) coordinate space may be performed on the merchant device 612 itself. Because the merchant device 612 is in the range of the beacon, the (x, y, z) coordinate representing the location of the beacon is assumed to be the location of the merchant device 612, even though the merchant device 612 might not literally be at the exact same location as the beacon. If the merchant device 612 is able to estimate its distance from the beacon (e.g. using received signal strength of the signal received from the beacon), then the estimated distance may be used to refine the accuracy of the (x, y, z) location coordinate assigned to the merchant device 612. The location of the merchant device 612 is hence tracked in an (x, y, z) coordinate space as the merchant device 612 is moved around the store. The coordinate space and coordinates may be stored in merchant device 612 and/or in product recommendation engine 402.

In one example, as the merchant device 612 is moved around the store, the merchant device 612 also identifies the presence of any products at each location. For example, a product may be identified by the merchant device 612 reading a machine-readable code (e.g. barcode or QR code) of each product. The machine-readable code uniquely identifies the product, and the location of the merchant device 612 at the instance of reading the code is used as the location of that product. For example, if the merchant device 612 is at coordinate (235, 456, 10) when the merchant device 612 scans the barcode of men's blue jeans, then the location of the men's blue jeans in the store 602 is captured as coordinate (235, 456, 10). Technology other than a machine-readable code may be applied in addition or as an alternative to a machine-readable code. For example, each product may include an RFID tag, e.g. RFID tag 654 in FIG. 4. The merchant device 612 may include an RFID reader that receives the digital data transmitted by the RFID tag 654.

The digital data from the tag uniquely identifies the product, and the location of the merchant device 612 at the time of reading the RFID tag is used as the location of that product. If the merchant device 612 is able to estimate its distance from the RFID tag (e.g. using received signal strength of the signal received from the RFID tag), then the estimated distance measurement may be used to refine the accuracy of the (x, y, z) location coordinate assigned to the product.

Other example ways may be used to populate the location data for products in the store 602, e.g. ways that do not involve assigning an (x, y, z) coordinate in a 3D space. For example, the display or storage unit in which or on which a product resides may be assigned a unique identifier (e.g. each shelf may be assigned a unique number), and a mapping in memory associates each product with the unique identifier of the display or storage unit in which or on which that product resides. For example, instead of (or in addition to) storing an (x, y, z) coordinate in the location column of FIG. 6, a shelf, rack, or bin number may be stored. A map of the retail store 602 may also be stored that documents the physical location of each unique display and storage unit.

Once the product inventory and location data 412 is captured, then the product inventory and location data 412 may be used by the product recommendation engine 402 to query what products are in stock and to query the location of those products. For example, if a recommendation rule 414 is executed and recommends a black 32-inch men's belt, the product recommendation engine 402 can confirm from the table in FIG. 6 that there are six in stock located at coordinate (95, 630, 10). The merchant device 612 knows its current location in the coordinate space and may therefore guide the merchant to coordinate (95, 630, 10), e.g. through visual or audible directions presented at the user interface 620 of the merchant device 612. Example ways to guide a merchant to a recommended product are described later.

Prior to visiting the retail store 602, visitor Fred might or might not have a user profile 410 stored in the memory 408 of the product recommendation engine 402. A user profile 410 for Fred may be previously established if Fred previously registered with the product recommendation engine 402 and provided information to create a user profile 410. For example, Fred may create an account with the product recommendation engine 402, thereby establishing a unique user ID, and then establish his user profile 410 by populating some information, e.g. personal information, billing information, and/or preferences. This may occur before Fred visits any merchants, e.g. by Fred accessing a software application via the user interface 640 of his user device 632 and using the software application to communicate with the product recommendation engine 402 in order to create an account, establish login information (linked to Fred's unique user ID), and establish his user profile 410. For example, the product recommendation engine 402 may be part of an e-commerce platform for which Fred registers as a buyer. As another example, the product recommendation engine 402 may be implemented as part of a platform specific to merchant Jane, and merchant Jane may have an app for her store that Fred downloads on his user device 632 and uses to create an account, login information, and the user profile 410. In any case, once the user profile 410 is established, it may be updated when Fred performs actions that provide user-specific information to the product recommendation engine 402, e.g. when Fred purchases a product, browses a merchant's online store, etc. In the remaining explanation below, it will be assumed that visitor Fred already has a user ID and associated user profile 410 on the product recommendation engine 402 when Fred walks into the retail store 602. Otherwise, only product recommendations could be made that are not user-specific to Fred, and Fred's user ID and user profile 410 may be established during Fred's visit, e.g. at checkout when information is collected about Fred.

Visitor Fred enters the retail store 602, and Fred is identified by the product recommendation engine 402. Some example ways to identify Fred are as follows. In one example, when Fred enters the store 602 carrying his user device 632, the user device 632 comes within the transmission range of a beacon at the entrance of the store 602. A message is received by the user device 632 from that beacon, e.g. over Bluetooth™. The message instructs the user device 632 to present a message on the user interface 640 of the user device 632 that asks Fred for permission to identify Fred to the merchant. Assuming Fred grants the permission via the user interface 640, the information uniquely identifying Fred (e.g. his login information and/or unique user ID) is transmitted from the user device 632 to the product recommendation engine 402. The processor 404 of the product recommendation engine 402 uses the received information to retrieve Fred's user profile 410, and instructs transmission of a message to merchant device 612 indicating that Fred has entered the store. The message sent to the merchant device 612 conveys any initial information from Fred's user profile 410 that may be of interest to the merchant (e.g. Fred's name and whether he is a return customer). Such information is presented on the user interface 620 of the merchant device 612 for the merchant to see. In some implementations, communication between the user device 632 and the product recommendation engine 402 and/or communication between the merchant device 612 and the product recommendation engine 402 may occur via one or more of the beacons in the store. In addition to or instead of using beacon technology in the example above, IPS and/or GPS may, additionally or alternatively, be used, e.g. to determine that Fred has entered the retail store 602. Communication between user device 632 and product recommendation engine 402 may then commence, e.g. over a wireless network.

Another example way to identify Fred when he enters the store 602 is as follows. A digital camera on the merchant device 612 captures a digital photograph of Fred's face, which may be done discretely, e.g. if the merchant device 612 comprises an AR device such as smart glasses having an embedded camera (e.g. camera 617). A digital photograph may alternatively be referred to as a digital image or simply an image. The digital photograph of Fred's face is transmitted to the product recommendation engine 402, which uses facial recognition to try to associate the photograph with a registered user. In one implementation this is achieved as follows. Prior to Fred entering the store 602 the product recommendation engine 402 already has a plurality of photographs of Fred (e.g. six to ten photographs). These photographs were previously provided by Fred or previously acquired in some other way, e.g. from Fred's previous visits to other stores. The processor 404 performs supervised learning on the plurality of photographs to train a machine learning algorithm to identify when Fred is present in a photograph. Post-training, when Fred enters retail store 602 and the new photograph of Fred is provided from the merchant device 612 to the product recommendation engine 402, the processor 404 executes the trained machine learning algorithm on the new photograph, and Fred is identified. The user profile 410 for Fred is then obtained and the relevant information transmitted to the merchant device 612.

Another example way to identify Fred when he enters the store 602 is for the merchant to ask Fred for his user ID (e.g. by Fred entering login information into merchant device 612 or directly sending it from user device 632 to merchant device 612), and then the merchant device 612 transmits Fred's user ID to the product recommendation engine 402 to obtain the information from Fred's user profile 410.

In some embodiments, the product recommendation engine 402 also tracks and stores in memory 408 the physical location of Fred in the store 602, e.g. using GPS information from user device 632, using an IPS, and/or by using beacon technology. For example, as explained earlier, in one embodiment Bluetooth™ beacons (e.g. beacon 656) are placed all around the store in order to partition the store into a plurality of 3D regions, where each 3D region spans the transmission range of a respective beacon. Therefore, when Fred's user device 632 enters the region of a beacon, the user device 632 receives the signal transmission from that beacon. The signal transmitted from that beacon includes the identifier of that beacon. The identifier is then transmitted from the user device 632 to the product recommendation engine 402, which has a predefined mapping of beacon identifies to physical locations in the store. The beacon may thereby be assigned a location coordinate in the store's (x, y, z) coordinate space using the beacon's known physical location. Because the user device 632 is in the range of the beacon, the (x, y, z) coordinate representing the location of the beacon is assumed to be the location of Fred, even though Fred might not literally be at the exact same spot as the beacon. If the user device 632 is able to estimate its distance from the beacon (e.g. using received signal strength of the signal received from the beacon), then the estimated distance may be used to refine the accuracy of the (x, y, z) location coordinate assigned to Fred. In any case, the location of Fred is recorded in the product recommendation engine 402.

Another example way to determine the location of Fred in the store is as follows. A digital photograph of Fred is captured by a digital camera on the merchant device 612, and that digital photograph is transmitted to the product recommendation engine 402. The processor 404 then implements a computer vision algorithm to try to identify the surroundings around Fred in the photograph, and thereby infer from those identified surroundings that Fred is in a particular location in the store 602. For example, each shelf, rack, and bin may have a feature that is unique and easily identifiable in a digital photograph, e.g. a retroreflective object. The computer vision algorithm searches for this feature (e.g. for the retroreflective object) in the digital photograph and uniquely identifies the feature, which is then mapped to a known location. That location is then recorded as Fred's location.

In some embodiments, Fred's location may be used to help merchant Jane track and/or locate Fred. For example, when Fred is first identified and is being viewed through Jane's AR glasses, a digital object may appear on the glasses accentuating Fred (e.g. a circle drawn around Fred's head with a tag indicating "Fred"). Computer vision may be used to determine exactly where Fred's head is in the image viewed in Jane's AR glasses. Then Jane may get distracted and turn away from Fred to deal with another matter. Fred moves to a different location in the store, and Jane wishes to find Fred again. Jane may indicate to the product recommendation engine 402 that she wishes to locate Fred, e.g. through a voice command "Find Fred". The product recommendation engine 402 transmits the current location of Fred to the merchant device 612. The merchant device 612 knows its location and Fred's location, and so displays instructions indicating the direction to move towards Fred. For example, an arrow may be displayed on Jane's AR glasses. When Jane is close to Fred, facial recognition may be used to identify Fred for Jane, e.g. based on the previous image of Fred captured when Fred first entered the store.

In some embodiments, the product recommendation engine 402 also tracks and stores in memory 408 any indication of a product in which Fred has expressed an interest while in the retail store 602. Depending upon the implementation, Fred may be considered to "express an interest" in a particular product if Fred picks up that product and/or goes near that product and/or stops/lingers near that product. The product recommendation engine 402 may determine that Fred has expressed an interest in a particular product in one or more different ways. A few examples are as follows. In one example, Fred's user device 632 moves within the range of beacon 656, which is mounted on a shelf at a location equal to where the men's blue jeans are displayed. The unique ID of the beacon 656 is transmitted to Fred's user device 632, and Fred's user device 632 forwards that unique beacon ID to product recommendation engine 402. The product recommendation engine 402 may therefore record that Fred has expressed an interest in men's blue jeans because the product recommendation engine 402 has a predefined mapping indicating that men's blue jeans are near that particular beacon. In some implementations, the product recommendation engine 402 may first determine whether Fred stops/lingers near the men's blue jeans, and only record that Fred has expressed an interest in men's blue jeans if it is determined that Fred stops/lingers near the men's blue jeans. Stopping/lingering may be deduced based on how fast Fred moves between two beacons placed on either side of beacon 656. In another example, the shelf displaying the men's blue jeans may include a weigh scale or movement sensor that indicates when a product has been picked up. That information may be transmitted to the product recommendation engine 402 and coupled with a location of Fred's user device to infer that Fred has picked up (and thereby has an interest in) men's blue jeans. In another example, a digital photograph of Fred is captured by a digital camera on the merchant device 612, and that digital photograph is transmitted to the product recommendation engine 402. A computer vision algorithm is executed on the digital photograph to try to infer whether Fred is looking at or holding a particular product. In another example, the merchant uses the user interface 620 of their merchant device 612 to manually enter products that Fred appears to be interested in, and this is transmitted to the product recommendation engine 402. In another example, the merchant device 612 records Fred as he speaks, e.g. as Fred speaks to the merchant. The voice recording is transmitted to the product recommendation engine 402 and voice recognition software is executed to determine whether the voice recording includes any product names, e.g. "jeans". The presence of a product name is interpreted as an indication that Fred has expressed an interest in that product.

Product recommendations will now be described. After Fred enters the store 602, and while he is in the store 602, the product recommendation engine 402 may execute one or more of the recommendation rules 414 to recommend one or more products for Fred. As explained earlier, recommendation rules 414 may be established in different ways, e.g. custom-created by merchant Jane, provided by a 3$^{rd}$ party (e.g. a fashion expert), added based on recommendation rules having a positive outcome for other merchants, generated using a machine learning algorithm, etc. Examples of recommendation rules are illustrated in FIG. 7. In some embodiments, the library of recommendation rules 414 may be very large, with the processor 404 of the product recommendation engine 402 traversing through the library and only executing recommendation rules for which the conditions are met, e.g. Rule 2 in FIG. 7 would never be executed if Fred's user profile 410 did not indicate a preferred material. In some embodiments, the recommendation rules 414 may be a subset of a master list of recommendation rules, with the subset created on a user-specific basis. For example, recommendation rules 414 in FIG. 7 may be specific to Fred based on the information in his user profile 410, and may be a subset of a larger master list of recommendation rules. The subset may be created in non-real time by filtering out any rules that have conditions that would not be met based on Fred's user profile 410. For example, because Fred's user profile 410 indicates he is an adult male, any rules in the master list having a condition relating to a women's product or a children's product would not be included in recommendation rules 414. Because Fred's user profile 410 may be updated over time, the recommendation rules 414 may also be updated over time, e.g. on a periodic basis. Then, when Fred enters the store 602 and is identified, in real-time (or near real-time) the product recommendation engine 402 traverses the recommendation rules 414 stored and executes the ones satisfying the conditions in order to output the product recommendation. As explained earlier, in some embodiments the recommendation rules 414 might not be discrete "if-then" statements like illustrated in FIG. 7, but may, additionally or alternatively, be relationships or patterns determined by a machine learning algorithm during training, with the trained machine learning algorithm generating the product recommendation based on an input to the trained machine learning algorithm. Information from Fred's user profile is provided to the trained machine learning algorithm to obtain the product recommendation. For example, the inputs "adult", "male", and "previously purchased blue jeans" may be retrieved from the use profile 410 and provided to the trained machine learning algorithm executed by the processor 404, and the recommendation returned may be mustard yellow T-shirt.

Some recommendation rules may have one or more conditions that are evaluated against information from a user profile 410, e.g. "IF jeans previously purchased THEN recommend belt". Some recommendation rules may have one or more conditions that rely on knowing the position (e.g. location and/or orientation) of the user in the store, and that are evaluated against the user's position (e.g. location and/or orientation) in the store, e.g. "IF user is near clearance bin THEN recommend blue socks" (e.g. because the merchant has a large quantity of blue socks to sell on clearance). Some recommendation rules may have one or more conditions that rely on the user having expressed an interest in a particular product when in the retail store, and that are evaluated against whether or not the user has expressed an interest in the particular product, e.g. "IF user expresses interest in black jeans THEN recommend brown belt". Some recommendation rules may have one or more conditions that are specific to the merchant's inventory and/or specific to products the merchant wishes to sell, e.g. "IF J.K. Renold Wallet in stock THEN recommend J.K. Renold Wallet" (e.g. because this wallet has a high profit margin). The recommendation rules may be dependent upon other conditions instead, i.e. the foregoing example conditions are non-limiting. Also, in actual implementation, many rules may be a combination of different conditions, e.g. as is the case for many of the example rules illustrated in FIG. 7, or as may be the case if machine learning is used to generate the rules. Depending upon the implementation, the conditions may be implemented as relationships or patterns determined by a machine learning algorithm during training, e.g. with the trained machine learning algorithm evaluating the conditions during its execution.

Once a product recommendation is generated, the recommendation may be transmitted to user device 632 for presentation at the user interface 640 of the user device 632, e.g. so that Fred can directly receive the recommendation. Alternatively (or additionally), the product recommendation may be transmitted to merchant device 612 for presentation at the user interface 620 of merchant device 612, e.g. so that the merchant can directly receive the recommendation. Transmitting the recommendation to the merchant device 612 may allow for the merchant to provide a seamless bespoke service to Fred, and possibly without interruption, e.g. if the recommendation is displayed on the top corner of AR glasses worn by the merchant. For example, merchant Jane may greet Fred when he arrives and ask him if he requires assistance. Fred is identified and the following recommended products for Fred are surfaced and transmitted to merchant device 612 for display on the top corner of Jane's glasses: black jean 32 in×34 in; belt; flannel shirts. Fred says to Jane that he is looking for a shirt. Jane sees that flannel shirts are a recommended product, and so suggests to Fred that she show him some new flannel shirts that just arrived. Fred's preferred color of blue (in Fred's user profile 410) is also transmitted to and displayed on Jane's glasses, and so she first shows Fred the blue flannel shirts. Fred is satisfied with the ease of the interaction and the suitability of the blue flannel shirt product, and so buys the product. Fred is not bothered with having to check his own user device 632 for product recommendations, and the presentation of the recommendations on Jane's AR glasses allows Jane to conduct the interaction with ease.

In some embodiments, an action may be performed to assist in guiding merchant Jane to a specific product. For example, Jane wishes to lead Fred to the blue flannel shirts, but she cannot remember where they are located in the store 602. The product recommendation engine 402 receives, from merchant device 612, an indication that navigation to the blue flannel shirts is desired. The indication may be provided by Jane, e.g. through a voice command to the merchant device 612: "Where are the blue flannel shirts?". The product recommendation engine 402 queries product inventory and location data 412 to retrieve the location of the blue flannel shirts. The location data is then used to guide merchant Jane to the shelf having blue flannel shirts.

Example ways in which the guiding may be implemented are as follows. In one example, the blue flannel shirts reside in or on a particular storage or display unit. Examples of storage or display units include shelves, racks, bins, counters, containers, etc. The storage or display unit on which or in which the blue flannel shirts reside has a unique ID to distinguish it from other storage/display units. That unique ID is transmitted to merchant device 612 for display on its user interface 620, e.g. the message "Blue flannel shirts are on shelf 27" is displayed. Alternatively (or additionally), each storage and display unit has a mechanism that, when activated, helps accentuate the unit, e.g. by emitting an alert via a light and/or sound and/or vibrating motion. The product recommendation engine 402 transmits an instruction to the unit on which or in which the blue flannel shirts reside, in order to accentuate that unit. For example, the shelf on which the blue flannel shirts reside lights up. Alternatively (or additionally), each product itself includes a mechanism that, when activated, helps accentuate the product. The product recommendation engine 402 transmits an instruction to the mechanism on the blue flannel shirts in order to accentuate the blue flannel shirts (e.g. a mechanism on a tag of the blue flannel shirt lights up and emits a noise). In another example, guiding is provided by having the merchant device 612 present audible or visual directions to the merchant, e.g. via AR wayfinding. The location of the blue flannel shirts is known (e.g. stored in the table illustrated in FIG. 6), and the current location of the merchant device 612 is also known (e.g. using an IPS, GPS or beacons, as described earlier). The product recommendation engine 402 may therefore transmit instructions to the merchant device 612, the instructions indicating the direction to move towards the blue flannel shirts. For example, a visual guide, such as an arrow, may be displayed on the screen of the merchant device 612. For example, assuming the merchant device 612 is AR glasses worn by the merchant, the arrow may be displayed as a digital AR object on the AR glasses.

As the merchant walks closer to the blue flannel shirts and the location of the merchant device 612 changes, the direction of the arrow is updated. When the merchant device 612 arrives at the general location of the blue flannel shirts, the camera of the merchant device 612 may capture a digital photograph of the location, and the digital photograph is processed using an image processing (e.g. computer vision) algorithm to try to identify the blue flannel shirts in the image. Once they are identified, a digital object may be presented on the AR glasses in order to accentuate the blue flannel shirts. For example, the digital object may be a green dot presented on the AR glasses over the blue flannel shirts and/or a mask applied over the other items surrounding the blue flannel shirts to grey out those other items and thereby more easily draw the attention of the merchant to the blue flannel shirts. Using a combination of position (e.g. location and/or orientation) data and image processing (e.g. computer vision) may be beneficial if the location data for the blue flannel shirts is only general location data and not accurate enough to locate exactly the blue flannel shirts. The location data brings the merchant to the general location, and computer vision is used to find the product within that general location.

The algorithm used to identify the recommended product in an image may be implemented in different ways. In one example implementation, each product sold by the merchant has or is associated with a physical feature that is unique to that product and easily identifiable in a digital image, e.g. a retroreflective object attached to each product that uniquely identifies that product. The algorithm retrieves, e.g. from a look-up table, an indication of the unique feature corresponding to the recommended product. The algorithm then searches for that unique feature in the digital image captured by the camera 617 of the merchant device 612. When the unique feature corresponding to the recommended product is located, the pixels in the digital image may be modified on and/or around the location of the unique feature in order to try to accentuate the recommended product. In another example implementation, the algorithm is a trained machine learning algorithm. During training, pictures of the merchant's products are provided to the machine learning algorithm, along with an indication of which one or more products are in each picture, and the location of each of the one or more products in each picture. The pictures may be of the products in the setting of the store, perhaps captured from typical angles at which a person would view the products when walking through the store. Post-training, when the merchant device 612 is in the general location of the recommended product, the digital image captured by the camera 617 of the merchant device 612 is provided as an input to the trained machine learning algorithm, and the trained machine learning algorithm provides an output that identifies the products in the image and their locations in the image. If the recommended product is identified, the pixels in the digital image may be modified on and/or around the location of the recommended product in order to try to accentuate the recommended product.

Figure 8:
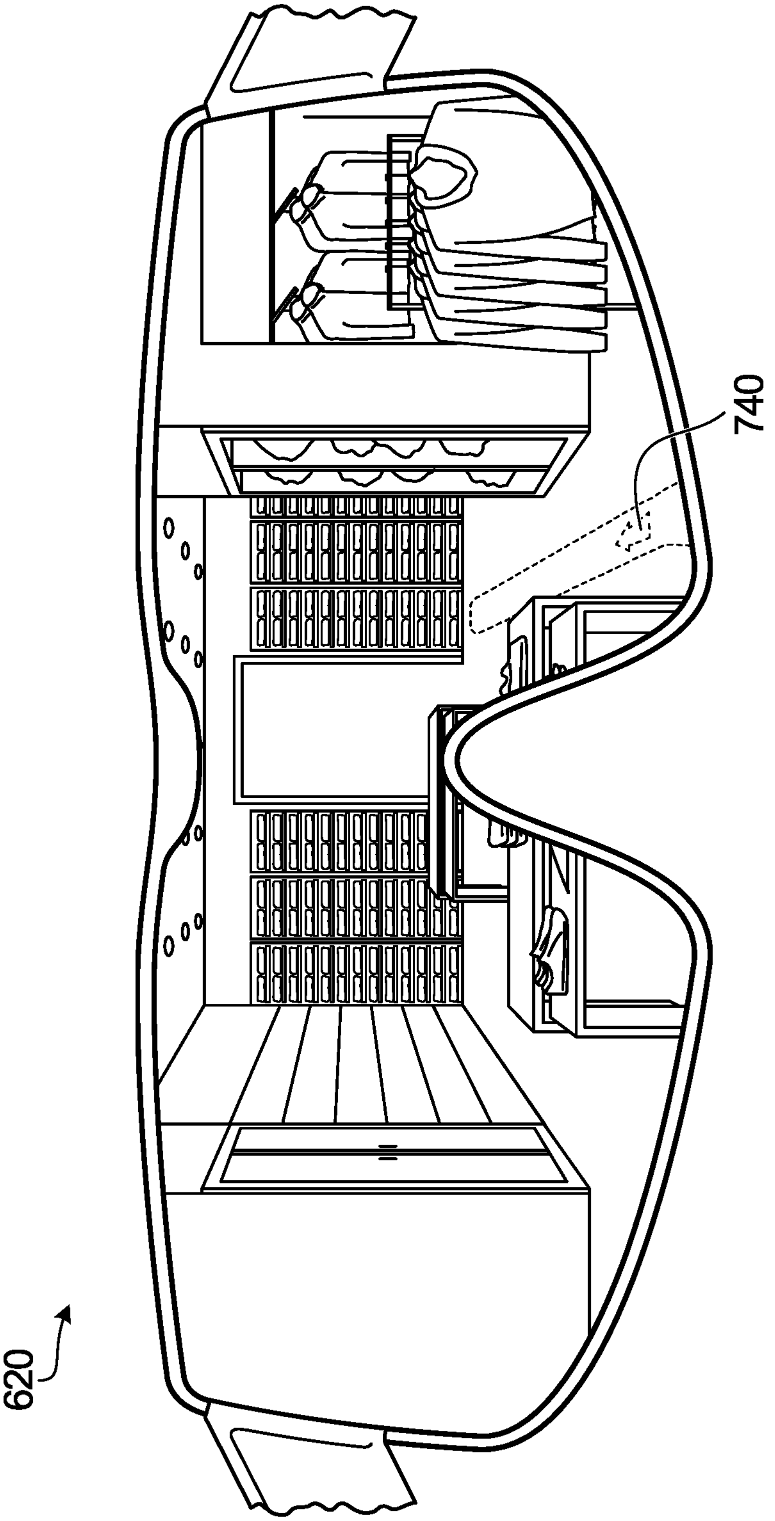
FIGS. 8 to 10 illustrate example user interfaces, according to various embodiments.
Figure 9:
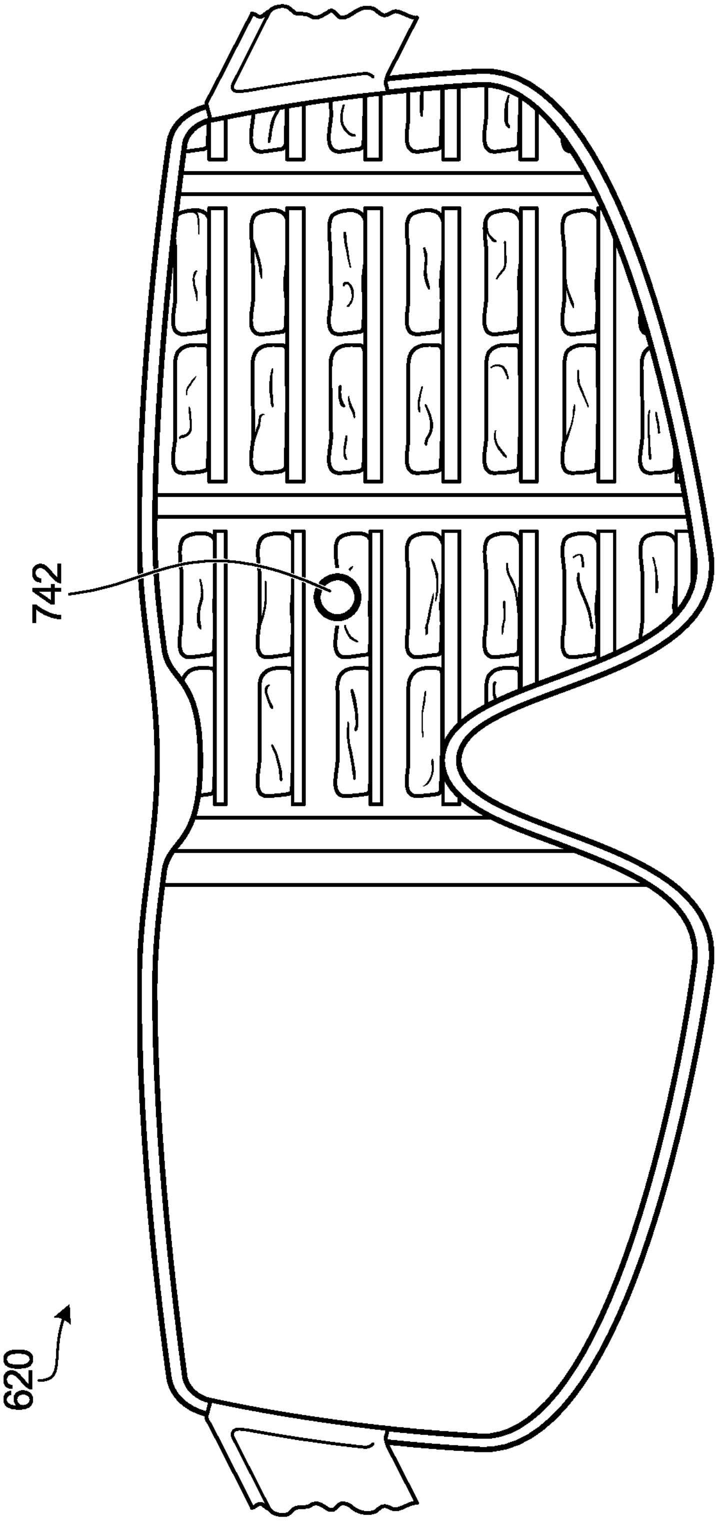

In view of the above, it will be appreciated that in some embodiments guiding the merchant to a recommended product may be a multi-step process. In the first step of the process, directions may be presented at the merchant device 612 to guide the merchant to a location near the recommended product. For example, the directions may be in the form of an audio and/or visual guide, e.g. a digital AR object in the form of an arrow may be displayed on the screen of the merchant device 612. For example, FIG. 8 illustrates the user interface 620 of the merchant device 612 displaying a visual guide in the form of an arrow 740. In FIG. 8, the merchant device 612 is AR glasses, and the recommended product is blue flannel shirts. The arrow 740 directing the merchant is superimposed on top of the image of the retail store that has been captured by the camera 617 of the merchant's device 612. As the merchant device 612 moves, the position of the merchant device 612 is tracked, e.g. using IPS, GPS or beacons, and/or using sensor 619. The physical location of the merchant device 612 may be mapped to a coordinate in a coordinate space, e.g. as described earlier. The position of the merchant device 612 is compared to the location of the recommended product, e.g. by comparing the coordinates (in the coordinate space) of the merchant device 612 to the known coordinates (in the same coordinate space) of the recommended product. The comparison may be performed at the merchant device 612 or by the product recommendation engine 402, depending upon the implementation. When the merchant device 612 is near the location of the recommended product, the images captured by the camera 617 of the merchant device 612 may be processed by the image processing algorithm mentioned above, to try to locate the recommended product in the captured digital image. When the recommended product is located, the recommended product may be accentuated. In one embodiment, this is implemented by modifying the pixel of the digital image to superimpose a digital object that visually accentuates the recommended product. For example, the digital object may be a dot presented over the recommended product and/or a mask applied over the other items surrounding the recommended product to grey out those other items and thereby more easily draw the attention of the merchant to the recommended product. For example, FIG. 9 illustrates the user interface 620 of the merchant device 612 at the point at which the merchant is near the recommended product. A digital object in the form of a dot 742 is placed over the blue flannel shirts in order to accentuate the blue flannel shirts.

Deciding that the merchant device 612 is "near" the recommended product is implementation specific. In one example implementation, the merchant device 612 is considered to be near the recommended product when the location of the merchant device 612 is determined to be at a location that is the same as or within a predefined distance from the location of the recommended product. For example, if the location of the recommended product is determined using an IPS to be at location (x, y, z), then the merchant device 612 may be determined to be near the location of the recommended product if the IPS determines that the merchant device 612 is at any location within 10 coordinate points in any direction from (x, y, z), e.g. (x±10, y±10, z±10). Instead of or in addition to IPS, another location tracking system may, alternatively or additionally, be used, e.g. GPS or the beacon method described earlier. In another example implementation, the merchant device 612 may be considered to be near the recommended product if the merchant device 612 is within the range of the same beacon associated with (e.g. closest to) the recommended product. In another example implementation, the merchant device 612 may be considered to be near the recommended product if the merchant device 612 recognizes (e.g. through image processing) that the merchant device 612 is near a particular area of the store and/or bin or shelf that is associated with the recommended product. In some embodiments, the comparison of the current location of the merchant device 612 to the location of the recommended product is performed continually or on a periodic basis, e.g. once every second.

The explanation above regarding how a merchant may be guided to a recommended product equally applies to the user/user device 632. For example, if the recommended product is transmitted to the user device 632, and user Fred indicates through the user interface 640 of the user device 632 that he wants to be led to that product, then the guiding methods described above may be performed. For example, the examples described and illustrated in FIGS. 8 and 9 could instead apply to a user device 632, although the user device 632 may (although not necessarily) be a mobile phone instead of AR glasses. Embodiments explained primarily from the perspective of the user device 632 are explained later.

In some embodiments, when a product recommendation is transmitted to a merchant or user device, information about the product may also be transmitted. For example, if men's blue jeans are recommended, then that recommendation may be transmitted to merchant Jane's AR glasses along with some basic information about the product (e.g. brand, type of material, etc.) so that Jane can explain details about the product without having the memorize all of the product details. In some embodiments, the product details are only displayed on the user interface 620 of the merchant device if an indication is received that the merchant may need to speak about the recommended product. For example, voice recognition software may monitor for the recommended product to be vocalized by the merchant (e.g. "You may be interested in men's blue jeans"), at which time the product details for the recommended product display on the merchant user interface 620 (e.g. "distressed", "denim", "stone washed", etc.).

In some embodiments, a product recommendation may be generated by the product recommendation engine 402 in response to a change in a field of view of a camera on a device. The device could be merchant device 612, e.g. if the recommendation was independent of the customer but instead based on where the merchant was positioned in the store. The device could instead be the user device 632, e.g. if the recommendation was based on where the customer was positioned in the store. In the example scenarios discussed immediately below, the device is user device 632.

As the user moves throughout retail store 602, the user (and hence the user device 632) changes position. "Position" means location, or orientation, or both location and orientation, depending upon the implementation. The user may be using their user device 632 to navigate, e.g. for the purposes of AR wayfinding and/or for the purposes of receiving information about products, etc. The position of the user device 632 is assumed to be the position of the user.

The field of view of the camera 637 on the user device 632 may change due to different reasons. As one example, the user may move from one location in the store 602 to another location in the store 602, such that the location of the user device 632 changes, e.g. the virtual coordinate and/or IPS coordinate of the user device 632 changes. When the user device 632 moves to a different location, the field of view of the camera 637 is determined to have changed. As another example, the orientation of the user device 632 may change, e.g. the user points the user device 632 up, down, or in a different direction. When the orientation of the user device 632 changes, the field of view of the camera 637 is determined to have changed. A change in orientation may be determined by sensor 639 of the user device 632, e.g. the sensor 639 may be an accelerometer or a magnetometer. In another example, a parameter associated with the camera 637 may change, which may change the field of view of the camera 637. For example, the user device 632 may change the magnification, focal length, and/or the angle of view of the camera 637, possibly in response to a user prompt at the user interface 640. When particular parameters associated with the camera 637 change, the field of view of the camera 637 is determined to have changed. As another example, the field of view of the camera 637 is determined to have changed when a change in the plurality of images being captured by the camera 637 is detected, e.g. the processor 634 of the user device 632 may use image processing to determine that the field of view of the camera 637 has changed. For example, if image processing indicates that a current image captured by the camera 637 does not correspond to one or more previous images captured by the camera 637, then it is determined that the field of view of the camera 637 has changed. As another example, a sequence of images captured by the camera 637 may be analyzed to directly determine if the field of view of the camera 637 has changed, or to detect motion, thereby inferring that the field of view of the camera 637 has changed.

In some embodiments, in response to detecting that the field of view of the camera 637 has changed, a plurality of products within or proximate to a current field of view of the camera 637 are identified. For example, an indication that the field of view of the camera 637 has changed is received by the product recommendation engine 402 (e.g. transmitted from the user device 632), and in response the product recommendation engine 402 determines products that are within or proximate to the current field of view of the camera 637. In another implementation, the processor 634 of the user device 632 itself, or some combination of the processor 634 and the product recommendation engine 402, determines products that are within or proximate to the current field of view of the camera 637. Different ways may be implemented to determine products that are within or proximate to the current field of view of the camera 637.

In some embodiments, the position of the user device 632 is used to determine products that are within or proximate to the current field of view of the camera 637. In a simple example, perhaps only the location of the user device 632 is used, e.g. if the virtual coordinate and/or IPS coordinate of the user device 632 is at or near the same location as the men's flannel shirts, then men's flannel shirts are considered to be within or proximate to the current field of view of the camera 637. In another example, orientation of the user device 632 may also be used to identify products that are within or proximate to the current field of view of the camera 637. For example, if a reading from an accelerometer or compass/magnetometer on the user device 632 indicates that the orientation of the user device 632 is in a particular direction, then one or more products near or at the location of the user device 632, and in that direction, are identified. For example, using dead reckoning, or an absolute measurement, based on the accelerometer and/or magnetometer, it may be determined that the user device 632 is pointing down at about a 45 degree angle in the direction north. The location of the user device 632 is determined to be at coordinate (695, 520, 20), e.g. using IPS, and/or beacon technology (e.g. the user device 632 comes within the range of a beacon at a particular location), and/or using a RFID reader on the user device 632 (e.g. the user device 632 reads an RFID tag indicative of location), and/or using a machine-readable code reader on a device (e.g. the user device 632 scans a barcode or QR code indicative of a location), and/or by image processing (e.g. an image captured by the camera 637 includes a feature indicative of the user device 632 being at a particular location). Once a coordinate corresponding to the location is known, e.g. once it is known that the user device 632 is at coordinate (695, 520, 20) in this example, then it is determined that projecting from that coordinate in the direction north at a 45 degree angle passes through or is near the coordinate (695, 332, 5). As per table 412 of FIG. 6, the coordinate (695, 332, 5) corresponds to the location of men's flannel shirts. Therefore, men's flannel shirts are considered within or proximate to the current field of view of the camera 637.

In some embodiments, image processing may be used in determining the position of the user device 632, e.g. at least one image captured by the camera 637 is used to identify at least one feature in the image that is indicative of the position of the user device 632. In one example, a machine learning algorithm is trained using images that each have a known association with a respective location in the store. Then, post-training, the trained machine learning algorithm determines a position of the user device 632 based on an image received from the camera 637 of the user device 632, e.g. the pixels of the image are used to determine certain objects and/or features in image, which the trained machine learning algorithm associates with known locations in store. In another example, unique features, such as markings and/or items (which may be retroreflective) are placed throughout the store and associated with known locations. Each feature has a unique mapping to a particular location in the store. Then, image processing is performed on one or more images captured by the camera 637 to search for the unique features. The specific features identified in the one or more images map to a particular location and/or an orientation of the user device 632.

In some embodiments, one or more parameters of the camera 637 may also or instead be considered when determining products that are within or proximate to the current field of view of the camera 637. For example, whether the camera view is back-facing or front-facing may indicate or influence the direction of the field of view. As another example, the magnification of the camera 637 may influence the scope of the field of view. For example, if the visual enlargement is high (the user is zooming in), then only products located on or immediately adjacent the direct line of sight of the camera 637 are categorized as within or proximate to the current field of view of the camera 637, whereas if the visual enlargement is low, then other additional products adjacent to, but farther away from the direct line of sight of the camera 637 are categorized as within or proximate to the current field of view of the camera 637.

In some embodiments, image processing may be used to determine the products that are within or proximate to the current field of view of the camera 637, possibly independent of explicitly determining the position of the user device 632. For example, image processing may be performed on an image captured by the camera 637 to identify one or more products in the image. The products identified in the image may be considered as the products that are within or proximate to the current field of view of the camera 637. Optionally, products outside the image but known to be near the products in the image may additionally be included as products that are within or proximate to the current field of view of the camera 637. A product may be identified in an image via image processing in different ways. In one example, each product (or bin or shelf on which or in which the product resides) has a feature that uniquely identifies the product, e.g. a particular retroreflective object. When the feature is uniquely identified in the image, the corresponding product is determined to be in the image. In another example, a machine learning algorithm may be trained using pictures of the products, e.g. supervised training is performed in which the machine learning algorithm is trained on a large number of pictures of each product. Then, post-training, when the camera 637 takes an image, the trained machine learning algorithm processes the image to identify which one or more products are in the image.

Some embodiments above and herein discuss a product being "near" a location or a device (e.g. near user device 632). What is considered to be "near" is implementation specific. In one example implementation, a product that is "near" something means it is at a location that is the same as or within a predefined distance from that thing. For example, if the location of the product is determined to be at location (x, y, z), then a device may be determined to be near the location of the product if the IPS determines that the device is at any location within 10 coordinate points in any direction from (x, y, z), e.g. (x±10, y±10, z±10). In another example implementation, a product is considered to be "near" something if the product is within the range of the same beacon associated with (e.g. closest to) that thing. In another example implementation, a product is considered to be "near" a device if the device recognizes (e.g. through image processing) that the device is in the camera view of a particular area of the store and/or bin or shelf that is associated with the product.

In some embodiments, in operation the user device 632 changes its field of view when the user is in the retail store 602, e.g. because the user changes the position of the user device 632 and/or changes a camera parameter (e.g. changes the magnification). In response, a plurality of products within or proximate to the current field of view are determined. Then, at least one of those products are recommended, i.e. identified as a recommended product. The product recommendation occurs in the manner described earlier, e.g. using user-specific information in the user profile 410 associated with the user device 632 and/or using recommendation rules (e.g. the rules in table 414 of FIG. 7).

Figure 10:
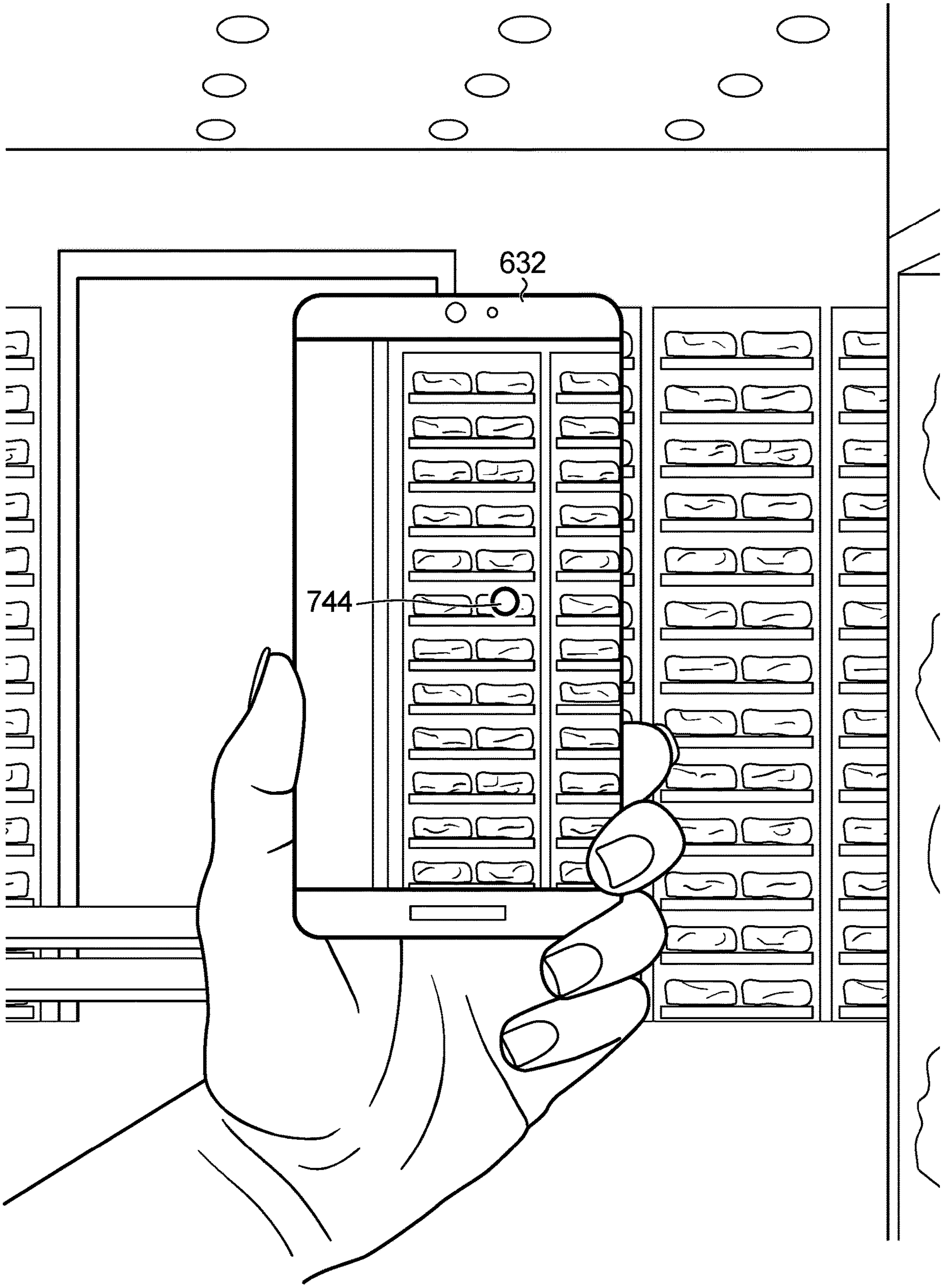
Figure 11:
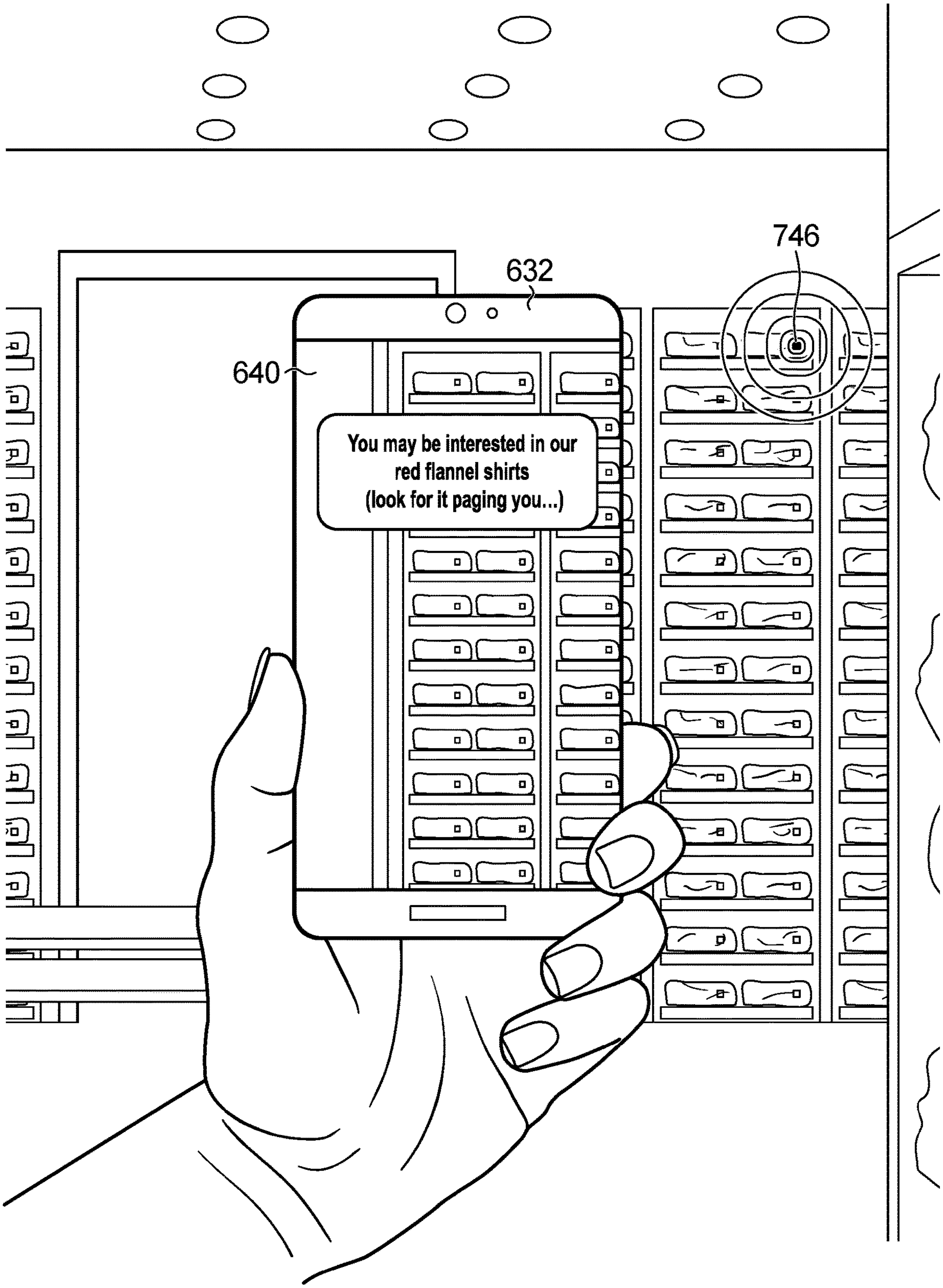
FIGS. 11 and 12 illustrate accentuation of a recommended product, according to various embodiments.
Figure 12:
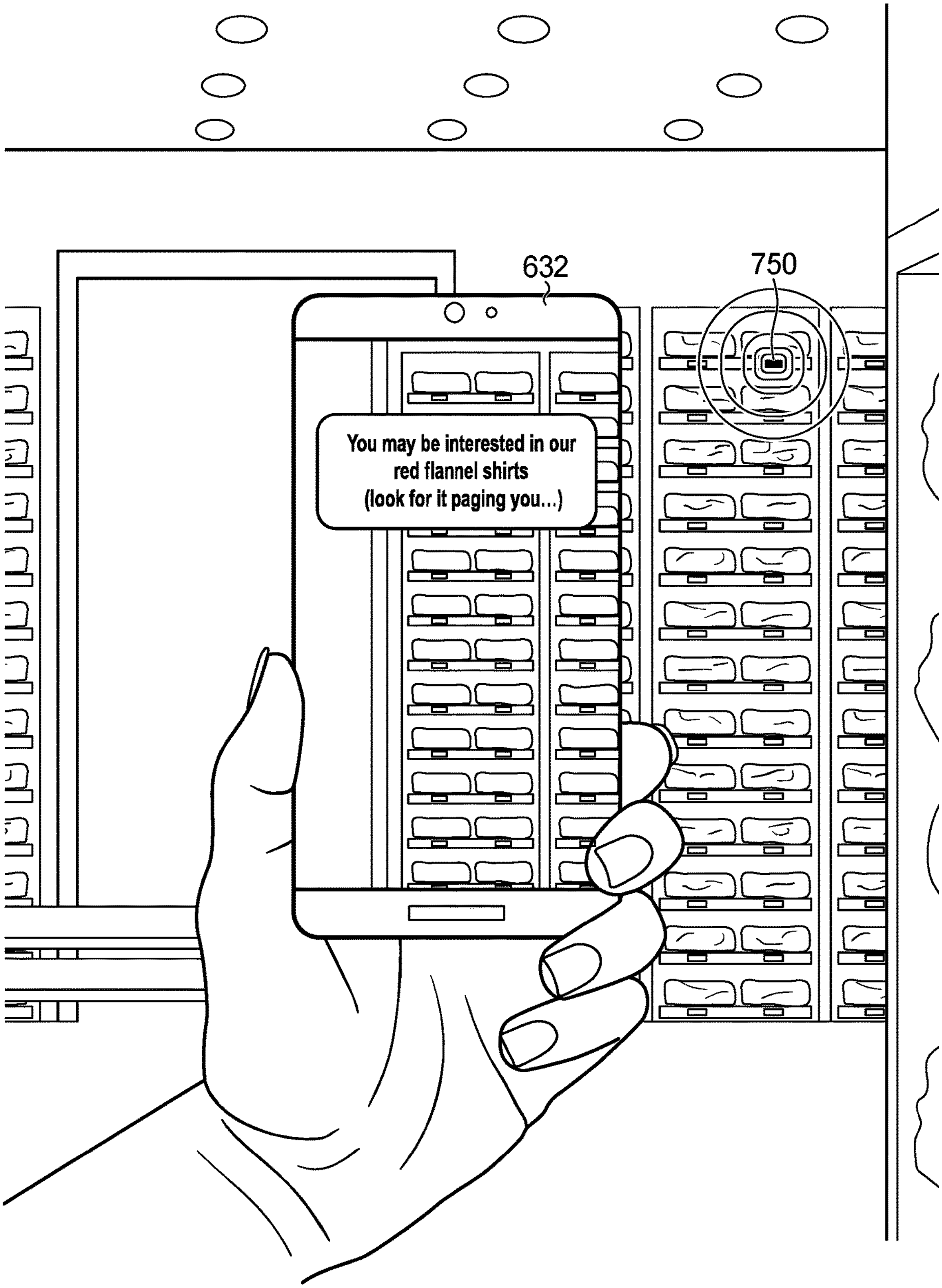

In some embodiments, the recommendation engine 402 causes accentuation of the recommended product. Examples of accentuation are introduced earlier. In one example, the accentuation is provided by identifying the product in the image captured by camera 637, e.g. via one of the methods described earlier, such as identifying a unique feature corresponding to that product via image processing. Then, modifying the pixel of the digital image to superimpose a digital object that visually accentuates the recommended product. For example, the digital object may be a dot presented over the recommended product and/or a mask applied over the other items surrounding the recommended product to grey out those other items and thereby more easily draw the attention of the customer to the recommended product. For example, FIG. 10 illustrates user device 632 at the point at which the user is near the recommended product, which in this example is blue flannel shirts. A digital object in the form of a dot 744 is placed over the recommended blue flannel shirts in order to accentuate the blue flannel shirts. In another example, the accentuation may, additionally or alternatively, be provided by instructing accentuation of a mechanism on the recommended product. For example, FIG. 11 illustrates a mechanism 746 affixed to a recommended red flannel shirt. The mechanism 746 emits light and vibrates. Optionally, this is coupled with a message on the user interface 640 of the user device 632 stating that "You may be interested in our red flannel shirts (look for it paging you . . . )". In another example, the accentuation is instead provided by instructing accentuation of a display or storage unit on which or in which the recommended product resides. For example, FIG. 12 is a variation of FIG. 11 in which an object 750 integrated into and/or affixed to the display shelf emits lights and vibrates. Note that accentuating a display or storage unit may be implemented by accentuating something that is connected to (e.g. affixed to) the display or storage unit. It may also or instead by implemented in a way that is not directly affixed to the display or storage unit but that still accentuates the display or storage unit, e.g. emitting light above or below the display or storage unit, and/or activating a light-up arrow pointing at the display or storage unit, etc.

The explanation above is made in relation to user device 632. However, the explanation above applies to merchant device 612, as applicable. In one example, the product recommendation may still be based on the user-specific information, but is based on the current field of view of the camera 617 of the merchant device 612, e.g. only products for the customer are recommended to the merchant that are within or in proximity to the field of view of the camera 617 of the merchant device 612. In this way, when the merchant is assisting the customer, the merchant may be recommended products for the customer, where the recommended products are in the vicinity of where the merchant is or is looking. In another example, the recommendations may be customer-independent and accentuated for the merchant and/or customer based on the field of view of the camera 617 of the merchant device 612.

Embodiments above involve recommending a product from a plurality of products, where the plurality of products are determined based on a current field of view of a camera of a device (e.g. a camera of the merchant device 612 or user device 632). Different benefits are possible in such embodiments. One benefit is that products are recommended that are within or close to the person or the field of view of the person. In real-time, or near real-time, as the person moves and looks about the store, products that may be of interest to that person, and are within or proximate to the field of view of the person's camera on their device, are recommended. Moreover, in some implementations, it may be possible to reduce or avoid the use of indoor navigation systems, such as IPS, which can sometimes be inaccurate and/or technically hard to implement. Instead, in some embodiments the field of view of the camera captures an image that may be used to identify products within or proximate to the current field of view of the camera, e.g. either by directly identifying products in the image, and/or by determining a location of the store from features in the image and mapping that location to products. Then a recommended product is selected from the identified products. In other embodiments, both an indoor navigation system and one or more images captured by the camera may be used to identify products within or proximate to the current field of view of the camera, e.g. if the one or more images from the camera supplement the information from the indoor navigation system.

Some further example methods will now be described.

Figure 13:
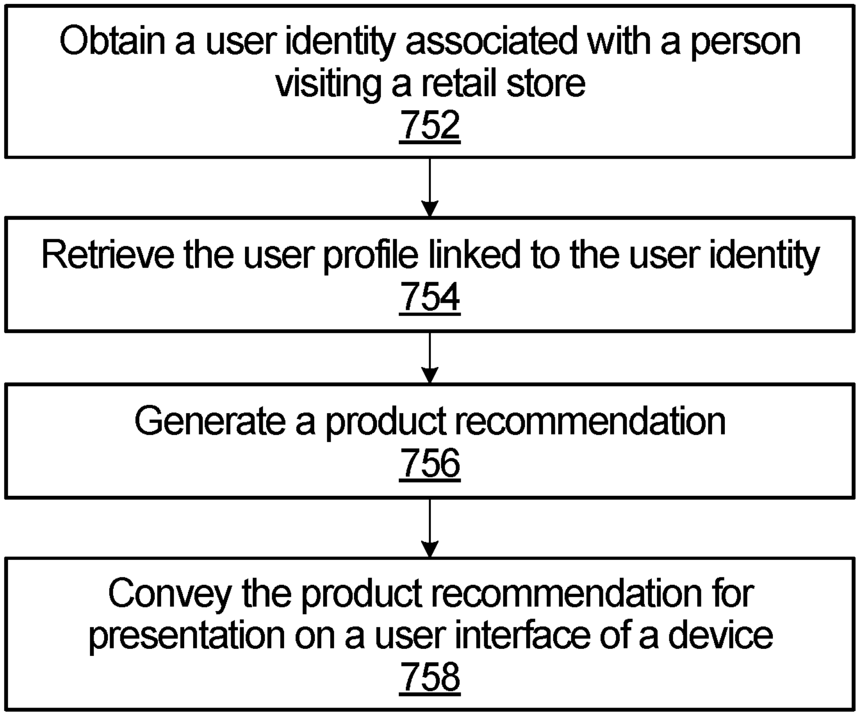
FIGS. 13 and 14 are computer-implemented methods, according to various embodiments.

FIG. 13 is a computer-implemented method, according to one embodiment. The method may be performed by a computing device, e.g. the product recommendation engine 402. In the method of FIG. 13, the steps are described as being performed by the processor 404 of the product recommendation engine 402, but this is only an example. For example, the steps may instead be performed by another entity, which might or might not be part of the product recommendation engine 402.

At step 752, the processor 404 obtains a user identity associated with a person visiting a retail store, e.g. the user identity of Fred is obtained when he enters merchant Jane's store in the examples described earlier. In one example, the user identity may be received by the processor 404 from the user device 632 via network interface 406, e.g. in response to the user of the user device 632 granting permission to share their information with the merchant. In another example, the user identity may be obtained by the processor 404 receiving a digital image of the user's face (e.g. from merchant device 612 via network interface 406), and using facial recognition to match the face in the digital image to a user identity.

At step 754, the processor 404 retrieves, from memory 408, the user profile 410 linked to the user identity. For example, the user ID may be used to uniquely identify the user profile 410 in memory 408. As discussed earlier, the user profile 410 stores information about the person, e.g. like in the example in FIG. 5. At step 756, the processor 404 generates a product recommendation. The product recommendation is for a product, which will be referred to as the recommended product. Note that "product", as used herein, can refer to a general product type, e.g. "jeans", "men's flannel shirts", or to a specific product, e.g. "J.K. Renold Wallet Brown Leather Product SKU 143221114987".

The product recommendation may be based on the information from the user profile 410, although this is not necessary (and if the product information is not based at least on some information from the user profile 410, the previous steps 752 and 754 might not be needed). Many examples of generating a product recommendation are described earlier. For example, in some embodiments the product recommendation may be based on one or more rules stored in memory 408 (e.g. recommended rules 414). In some embodiments, generating the product recommendation may include evaluating the information from the user profile 410 against one or more conditions of a rule, and selecting the product recommendation as the outcome indicated by the rule when every condition of the rule is met. For example, if the information in the user profile indicates that the user previously viewed a flannel shirt online and if flannel shirts are in stock, then every condition of rule 6 of FIG. 7 is met, and so the product recommendation is the rule outcome: recommend flannel shirts. In some embodiments, one or more of the rules are relationships or patterns determined by a machine learning algorithm during training, and generating the product recommendation comprises providing the information from the user profile as an input to the machine learning algorithm and selecting the product recommendation from a resulting output of the machine learning algorithm.

In some embodiments, the processor 404 also retrieves inventory information indicative of which one or more products are in stock in the retail store, and step 756 includes generating the product recommendation based on both the information from the user profile and the inventory information. The particular product recommended is therefore one that is in stock in the retail store. For example, a condition of an "if-then" rule may evaluate whether the product is in stock (e.g. like in rules 1 and 4-6 of FIG. 7). As another example, the outcome of a rule may be checked to determine whether the potential product for recommendation is in stock, and only recommend the product if it is in stock (e.g. Rule 3 of FIG. 7 may be executed but the belt only actually recommended once the processor 404 confirms that belts are in stock). As another example, the product inventory in stock may be provided as an input to the machine learning algorithm performing the product recommendations, which may occur during training and/or post training.

In some embodiments, when step 756 is performed, the information in the user profile may include purchase history of the person (e.g. purchase history 716 of FIG. 5), and the product recommendation may be generated based on the purchase history. In some embodiments, the information in the user profile may include an indication of one or more products viewed online by the person (e.g. browsing history 720 of FIG. 5), and the product recommendation may be generated based on the indication of the one or more products viewed online by the person.

At step 758, the processor 404 conveys the product recommendation for presentation on a user interface of a device. The device may be merchant device 612 or user device 632, or the recommendation may be conveyed to both devices. The dot 742 in FIG. 9 and the dot 744 in FIG. 10 are examples ways in which the product recommendation may be presented. Additionally or alternatively, the recommendation may simply be text or the like, "e.g. blue flannel shirts". The recommendation presented on the user interface may be separate from how the recommended product is accentuated, e.g. in FIGS. 11 and 12 the product recommendation presented on the user interface is "You may be interested in our red flannel shirts", whereas the recommended product is separately accentuated via mechanism 746 of FIG. 11 or object 750 of FIG. 12.

If the product recommendation engine 402 is implemented on the merchant device 612, then conveying the product recommendation for presentation on the user interface of the merchant device 612 may involve the processor 404 instructing the user interface 620 of the merchant device 612 to present (e.g. display) an indication of the particular product recommended. If the product recommendation engine 402 is separate from the merchant device 612 (e.g. as illustrated in FIG. 4), then conveying the product recommendation may involve the processor 404 issuing an instruction to send a message through the network interface 406 to merchant device 612, where the message includes an indication of the recommended product. The indication of the recommended product may then be presented (e.g. displayed) by the merchant device 612 on the user interface 620 of the merchant device. That is, the act of conveying the product recommendation for presentation on the user interface of the device in step 758 can include transmitting, to the merchant device, an indication of the particular product recommended. The transmission may be instructed by the processor 404. The same applies to if the product recommendation is conveyed for presentation on the user interface 640 of the user device 632. That is, the act of conveying may involve instructing the user interface 640 of the user device 632 to present (e.g. display) an indication of the particular product recommended, and/or it may involve the processor 404 issuing an instruction to send a message through the network interface 406 to user device 632, where the message includes an indication of the recommended product.

In some embodiments, conveying the product recommendation for presentation on the user interface of the device may include conveying an indication of the recommended product for display on the user interface of the device.

In some embodiments, generating the product recommendation may include detecting that a field of view of a camera of the device has changed, and responsive to detecting that the field of view of the camera has changed, determining a plurality of products within or proximate to a current field of view of the camera. At least one of the plurality of products may be identified as the recommended product. In some embodiments, the method may further include causing accentuation of the recommended product. Examples of causing accentuation are described earlier, e.g. instructing accentuation of a mechanism on the recommended product, and/or instructing accentuation of a display or storage unit on which or in which the recommended product resides, and/or instructing presentation of a visual indicator on the display of the device, where the visual indicator accentuates the recommended product in an image displayed on the display of the device.

In some embodiments, detecting that the field of view of the camera has changed may include at least one of: detecting a change in position of the device, and/or detecting a change in an image captured by the camera, and/or detecting a change in at least one parameter of the camera. In some embodiments, the position may include location and orientation of the device. In some embodiments, the orientation may be determined from at least one sensor on the device. In some embodiments, determining the plurality of products may include determining which products are within or proximate to the current field of view of the camera based on: at least one parameter of the camera, and/or the location of the device, and/or the orientation of the device.

In some embodiments, the product recommendation is for a particular product. The term "particular product" can refer to a general product type, e.g. the recommendation is for "jeans", "men's flannel shirts", or to a specific product, e.g. the recommendation is for "J.K. Renold Wallet Brown Leather Product SKU 143221114987". In some embodiments, the method of FIG. 13 includes obtaining device location data indicating a location of the device, and determining whether the location of the device is equal to or within a predefined distance from a location of the particular (recommended) product. For example, the device location data may be a coordinate, e.g. as described earlier, which may be determined using an IPS, GPS, beacon technology (e.g. in the manner described above), or some other technology. The location of the particular product may also be known, e.g. a coordinate in a positioning system, a shelf or bin number, etc. In some embodiments, if it is determined that the location of the device is equal to or within a predefined distance from a location of the particular product, then the processor 404 may cause accentuation of the particular product. The "predefined distance" is implementation specific and may be a distance set during design or initialization that reflects a distance that is not too far from the location of the particular product. In some embodiments, causing accentuation of the particular product may include at least one of: instructing accentuation of a mechanism on the particular product (e.g. causing a device attached to the product to vibrate and/or light up); instructing accentuation of a unit on which or in which the particular product resides (e.g. causing a particular bin or shelf to light up); or instructing presentation of a visual indicator on a display of the device (e.g. a digital object using AR). The visual indicator may accentuate the particular product in an image displayed on the display of the device. In some embodiments, prior to instructing presentation of the visual indicator on the display of the device, the method may further include using image processing to locate the particular product in the image displayed on the display of the device.

In some embodiments, the method of FIG. 13 may include determining a location of the person in the store, and step 756 may involve generating the product recommendation based on the location of the person in the store. In some embodiments, determining the location of the person in the store may include: (i) receiving a message from a user device associated with the person, the message providing the identity of a beacon located in the store; (ii) mapping the identity of the beacon to a beacon location in the store; and (iii) determining the location of the person in the store based on the beacon location.

In some embodiments, the method of FIG. 13 further includes instructing accentuation of a mechanism on the particular product that is recommended and/or instructing accentuation of a unit on which or in which the particular product resides.

In some embodiments, the method of FIG. 13 further includes determining a location (in the store) of the particular product that is recommended, and instructing the merchant device to display a visual guide on the user interface of the merchant device. The visual guide is for helping to guide the merchant to the particular product. The visual guide may be an AR digital image on the user interface of the merchant device that points in a direction of the particular product and/or that accentuates the particular product. In some embodiments, the location of the particular product that is recommended is determined based on the location of a device (e.g. barcode reader, QR code reader, RF tag reader, etc.) used to identify the particular product, at the time the device is identifying the particular product. An example is described earlier in which the merchant device 612 moves throughout the store identifying products, and when a product is identified the location of the merchant device 612 is used as the location of the identified product. In such situations, the merchant device 612 used to determine the location of the product in the store might not be the same merchant device 612 used by the merchant to receive product recommendations.

Figure 14:
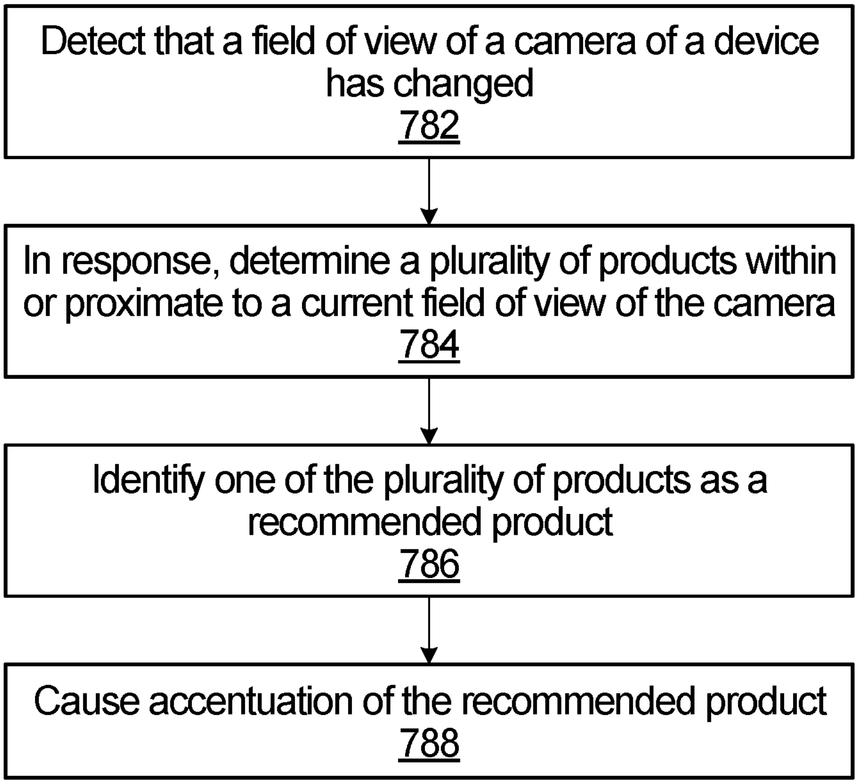

FIG. 14 is a computer-implemented method, according to another embodiment. The method may be performed by a computing device, e.g. the product recommendation engine 402. In the method of FIG. 14, the steps are described as being performed by the processor 404 of the product recommendation engine 402, but this is only an example. For example, the steps may instead be performed by another entity, which might or might not be part of the product recommendation engine 402. The entity might be partially or fully implemented in a device, such as a user device or a merchant device.

At step 782, the processor 404 detects that a field of view of a camera of a device has changed. Example ways to perform such a detection are described earlier, e.g. the detection may be based on a change in image captured by the camera and/or a change in position of the device, etc. In one example, detecting that the field of view of the camera has changed includes at least one of: detecting a change in position of the device; detecting a change in an image captured by the camera; or detecting a change in at least one parameter of the camera. In some embodiments, detecting that a field of view of the device's camera has changed may be implemented by the processor 404 receiving, from the device, an indication that the field of view of the device's camera has changed. That indication may be an explicit indication, or it may be implicit, e.g. an updated location and/or orientation of the device is received, which is different from the last known location and/or orientation, and which thereby acts as an inherent indication that the field of view of the device's camera has changed. Note that the device may be user device 632 or merchant device 612, depending upon the implementation.

At step 784, responsive to detecting that the field of view of the camera has changed, the processor 404 determines a plurality of products within or proximate to a current field of view of the camera. Example ways to determine the plurality of products are described earlier. As discussed earlier, the products may be identified based on the position of the device and/or based on products or features identified in an image captured by the camera of the device, etc. In one example, the plurality of products is determined based on the position of the device, and the position of the device may include the location and/or the orientation of the device. In one example, the position includes location and orientation of the device. In some embodiments, the orientation may be determined from at least one sensor on the device. For example, the at least one sensor may be or include an accelerometer, and the orientation of the device may be determined using the accelerometer. In some embodiments, determining the plurality of products may include determining which products are within or proximate to the current field of view of the camera based on: at least one parameter of the camera, and/or based on the location of the device, and/or based on the orientation of the device. In some embodiments, the location of the device may be determined using at least one of: an IPS; a beacon; a RFID reader on the device; a machine-readable code reader on the device; or image processing of at least one image captured by the camera of the device.

In some embodiments, the position of the device may be determined by performing processing of at least one image captured by the camera to identify at least one feature in the image that is indicative of the position of the device. For example, as explained earlier, a trained machine learning algorithm may determine a position of the device based on features in the image, and/or a feature in the form on a retroreflective object in the image may be associated with a known location.

At step 786, the processor 404 identifies one of the plurality of products as a recommended product. Several recommended products could be identified. A recommended product may be identified based on any of the ways described earlier, e.g. based on the user-specific information for the person associated with the device. In some embodiments, identifying one of the plurality of products as the recommended product may include: (i) obtaining a user identity of a person visiting the retail store; (ii) retrieving, from memory, a user profile linked to the user identity, the user profile storing information about the person; and (iii) generating the recommended product based on the information from the user profile. The person may be associated with the device (e.g. the owner of the device), but they do not have to be. For example, a merchant could be assisting a customer, and the device in the method may be the merchant's device. In some embodiments, the information in the user profile may include an indication of one or more products viewed online by the person, and the recommended product may be generated based on the indication of the one or more products viewed online by the person. In some embodiments, the information in the user profile may include purchase history of the person, and the recommended product may be generated based on the purchase history.

In some embodiments, generating the recommended product may include evaluating the information from the user profile against one or more conditions of a rule, and selecting the recommended product as the outcome indicated by the rule when every condition of the rule is met. In some embodiments, generating the recommended product may include providing the information from the user profile as an input to a machine learning algorithm and selecting the recommended product from a resulting output of the machine learning algorithm.

Optionally, at step 788, the processor 404 causes accentuation of the recommended product. Example ways to cause accentuation are described earlier and may include, for example: instructing accentuation of a mechanism on the recommended product, and/or instructing accentuation of a display or storage unit on which or in which the recommended product resides, and/or instructing presentation of a visual indicator on a display of the device, where the visual indicator accentuates the recommended product in an image displayed on the display of the device.

In some embodiments, determining the plurality of products may include: (i) determining candidate products based on the position of the device; (ii) performing image processing on an image captured by the camera to determine a subset of the candidate products that are present in the image; and (iii) selecting the plurality of products as the subset of the candidate products that are present in the image. For example, in such embodiments, the position of device allows for carving out a smaller set of candidate products (e.g. device is in shoe section, and so candidate products are shoes). Then, image processing may be performed to identify which ones of the candidate products are actually in the field of view. The position of the device does not necessarily need to include the orientation of device, e.g. the position of the device could just be the location of the device. Location might be easier to determine than orientation. In some embodiments, performing the image processing may include identifying features in the image that identify the subset of candidate products. As one example, a trained machine learning algorithm may be used to identify products based on features in the image. In one example, a feature (such as a tag) on the product or storage or display unit in which or on which the product resides is identified in the image, and it maps to one or more particular products.

In some embodiments, a system is provided for performing the methods described above. The system may include a memory (e.g. memory 408) to store a user identity associated with a person visiting a retail store, and to store a user profile having information about the person. The system may further include at least one processor (e.g. processor 404) to perform operations such as obtain the user identity, retrieve the user profile based on the user identity, generate a product recommendation based on the information from the user profile, and/or convey the product recommendation for presentation on a user interface of a device. In some embodiments, a computer-readable medium is provided having stored thereon computer-executable instructions that, when executed by a computer, cause the computer to perform method steps described above.

CONCLUSION

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

The invention claimed is:

1. A computer-implemented method comprising:

generating, by a first machine learning algorithm, a product recommendation for a recommended product based on information from a user profile associated with a person visiting a retail store; and conveying the product recommendation using augmented reality in real-time for output on a user interface of an augmented reality device associated with the person as the person moves throughout the retail store, the conveying including:

in response to detecting a change in a field of view of a camera, performing image processing of an image captured by the camera of the augmented reality device, the image processing comprising inputting the image captured by the camera into a second machine learning algorithm that is trained to identify products in the image in order to generate an output that identifies a plurality of products in the image that are within or proximate to a current field of view of the camera;

determining, from the plurality of products identified by the second machine learning algorithm, one of the plurality of products within or proximate to the current field of view as the recommended product corresponding to the product recommendation generated by the first machine learning algorithm; and causing accentuation of the recommended product on the user interface using the augmented reality by generating virtual content accentuating the recommended product on the user interface, and overlaying the virtual content onto the image captured by the camera, the virtual content generated and overlaid onto the image by modifying pixels of the image displayed on the user interface on and/or around a location of a product identified by the second machine learning algorithm that corresponds to the recommended product.

2. The computer-implemented method of claim 1, further comprising training the second machine learning algorithm by performing operations including:

creating a training set comprising:

(i) images of products in a setting of the retail store, and (ii) an indication of which one or more products are in each of the images; and training the second machine learning algorithm using the training set.

3. The computer-implemented method of claim 1, wherein the output generated by the second machine learning algorithm also indicates a location of each of the plurality of the products in the image.

4. The computer-implemented method of claim 1, wherein modifying the pixels of the image displayed on the user interface comprises:

modifying the pixels to overlay the virtual content on the recommended product to accentuate the recommended product.

5. The computer-implemented method of claim 1, wherein modifying the pixels of the image displayed on the user interface comprises:

modifying the pixels to overlay the virtual content on other items in the image surrounding the recommended product to mask the other items and thereby accentuate the recommended product.

6. The computer-implemented method of claim 1, wherein the product recommendation is based on one or more rules stored in memory, wherein the one or more rules are relationships or patterns determined by the first machine learning algorithm during training, and wherein generating the product recommendation comprises providing the information from the user profile as an input to the first machine learning algorithm and selecting the product recommendation from a resulting output of the first machine learning algorithm.

7. The computer-implemented method of claim 1, comprising detecting that the field of view of the camera has changed by detecting a change in position of the augmented reality device.

8. The computer-implemented method of claim 1, comprising detecting that the field of view of the camera has changed by detecting a change in the image captured by the camera.

9. The computer-implemented method of claim 1, comprising detecting that the field of view of the camera has changed by detecting a change in at least one parameter of the camera.

10. The computer-implemented method of claim 1, wherein causing the accentuation of the recommended product further comprises also activating an accentuation mechanism, the accentuation mechanism on the recommended product in the retail store or on a display unit or storage unit on which or in which the recommended product resides in the retail store.

11. A system comprising:

at least one processor; and a memory storing processor-executable instructions that, when executed by the at least one processor, cause the system to:

generate, by a first machine learning algorithm, a product recommendation for a recommended product based on information from a user profile associated with a person visiting a retail store; and convey the product recommendation using augmented reality in real-time for output on a user interface of an augmented reality device associated with the person as the person moves throughout the retail store, the conveying including:

in response to detecting a change in a field of view of a camera, performing image processing of an image captured by the camera of the augmented reality device, the image processing comprising inputting the image captured by the camera into a second machine learning algorithm that is trained to identify products in the image in order to generate an output that identifies a plurality of products in the image that are within or proximate to a current field of view of the camera;

determining, from the plurality of products identified by the second machine learning algorithm, one of the plurality of products within or proximate to the current field of view as the recommended product corresponding to the product recommendation generated by the first machine learning algorithm; and causing accentuation of the recommended product on the user interface using the augmented reality by generating virtual content accentuating the recommended product on the user interface, and overlaying the virtual content onto the image captured by the camera, the virtual content generated and overlaid onto the image by modifying pixels of the image displayed on the user interface on and/or around a location of a product identified by the second machine learning algorithm that corresponds to the recommended product.

12. The system of claim 11, wherein the processor-executable instructions, when executed by the at least one processor, further cause the system to:

create a training set comprising:

(i) images of products in a setting of the retail store, and (ii) an indication of which one or more products are in each of the images; and train the second machine learning algorithm using the training set.

13. The system of claim 11, wherein the output generated by the second machine learning algorithm also indicates a location of each of the plurality of the products in the image.

14. The system of claim 11, wherein modifying the pixels of the image displayed on the user interface comprises:

modifying the pixels to overlay the virtual content on the recommended product to accentuate the recommended product.

15. The system of claim 11, wherein modifying the pixels of the image displayed on the user interface comprises:

modifying the pixels to overlay the virtual content on other items in the image surrounding the recommended product to mask the other items and thereby accentuate the recommended product.

16. The system of claim 11, wherein the product recommendation is based on one or more rules stored in memory, wherein the one or more rules are relationships or patterns determined by the first machine learning algorithm during training, and wherein the processor-executable instructions, when executed by the at least one processor, cause the system to generate the product recommendation by: providing the information from the user profile as an input to the first machine learning algorithm and selecting the product recommendation from a resulting output of the first machine learning algorithm.

17. The system of claim 11, wherein the processor-executable instructions, when executed by the at least one processor, cause the system to detect that the field of view of the camera has changed by detecting a change in position of the augmented reality device.

18. The system of claim 11, wherein the processor-executable instructions, when executed by the at least one processor, cause the system to detect that the field of view of the camera has changed by detecting a change in the image captured by the camera.

19. The system of claim 11, wherein the processor-executable instructions, when executed by the at least one processor, cause the system to detect that the field of view of the camera has changed by detecting a change in at least one parameter of the camera.

20. A non-transitory computer readable medium storing computer executable instructions which, when executed by a computer, cause the computer to perform a method comprising:

generating, by a first machine learning algorithm, a product recommendation for a recommended product based on information from a user profile associated with a person visiting a retail store; and conveying the product recommendation using augmented reality in real-time for output on a user interface of an augmented reality device associated with the person as the person moves throughout the retail store, the conveying including:

in response to detecting a change in a field of view of a camera, performing image processing of an image captured by the camera of the augmented reality device, the image processing comprising inputting the image captured by the camera into a second machine learning algorithm that is trained to identify products in the image in order to generate an output that identifies a plurality of products in the image that are within or proximate to a current field of view of the camera;

determining, from the plurality of products identified by the second machine learning algorithm, one of the plurality of products within or proximate to the current field of view as the recommended product corresponding to the product recommendation generated by the first machine learning algorithm; and causing accentuation of the recommended product on the user interface using the augmented reality by generating virtual content accentuating the recommended product on the user interface, and overlaying the virtual content onto the image captured by the camera, the virtual content generated and overlaid onto the image by modifying pixels of the image displayed on the user interface on and/or around a location of a product identified by the second machine learning algorithm that corresponds to the recommended product.

* * * * *